United States Patent
Negri et al.

(10) Patent No.: US 11,853,047 B2
(45) Date of Patent: Dec. 26, 2023

(54) SENSOR-AGNOSTIC MECHANICAL MACHINE FAULT IDENTIFICATION

(71) Applicant: AUGURY SYSTEMS LTD., Haifa (IL)

(72) Inventors: Ori Negri, Haifa (IL); Christopher Bethel, New York, NY (US); Daniel Barsky, Haifa (IL); Gal Ben-Haim, Haifa (IL); Gal Shaul, Haifa (IL); Saar Yoskovitz, Haworth, NJ (US)

(73) Assignee: AUGURY SYSTEMS LTD., Haifa (IL)

( * ) Notice: Subject to any disclaimer, the term of this patent is extended or adjusted under 35 U.S.C. 154(b) by 0 days.

(21) Appl. No.: 17/639,795

(22) PCT Filed: Sep. 3, 2020

(86) PCT No.: PCT/IL2020/050958
§ 371 (c)(1),
(2) Date: Mar. 2, 2022

(87) PCT Pub. No.: WO2021/044418
PCT Pub. Date: Mar. 11, 2021

(65) Prior Publication Data
US 2022/0334573 A1 Oct. 20, 2022

Related U.S. Application Data

(60) Provisional application No. 62/895,247, filed on Sep. 3, 2019.

(51) Int. Cl.
*G05B 23/02* (2006.01)

(52) U.S. Cl.
CPC ....... *G05B 23/024* (2013.01); *G05B 23/0281* (2013.01); *G05B 23/0283* (2013.01)

(58) Field of Classification Search
CPC .............. G05B 23/024; G05B 23/0281; G05B 23/0283
See application file for complete search history.

(56) References Cited

U.S. PATENT DOCUMENTS

| | | | |
|---|---|---|---|
| 11,620,518 B2* | 4/2023 | Lumezanu | G06N 3/044 706/25 |
| 2015/0346066 A1* | 12/2015 | Dutta | G01M 99/008 702/183 |

(Continued)

OTHER PUBLICATIONS

An International Search Report and a Written Opinion both dated Feb. 10, 2021, which issued during the prosecution of Applicant's PCT/IL2020/050958.

(Continued)

*Primary Examiner* — Manuel L Barbee
(74) *Attorney, Agent, or Firm* — Leason Ellis LLP

(57) ABSTRACT

A method for identifying a fault of at least one mechanical machine, including causing a first plurality of sensors coupled to a corresponding first plurality of mechanical machines to acquire a first plurality of sets of signals emanating from the first plurality of mechanical machines, the first plurality of mechanical machines sharing at least one characteristic, supplying at least the first plurality of sets of signals of the first plurality of mechanical machines to a pre-existing fault classifier previously trained to automatically identify faults of a second plurality of mechanical machines based on signals emanating therefrom and previously acquired by a second plurality of sensors, the second plurality of sensors being of a different type than the first plurality of sensors, the second plurality of mechanical machines sharing the at least one characteristic, modifying the pre-existing fault classifier by employing transfer learning, based at least on the first plurality of sets of signals of the first plurality of mechanical machines, thereby providing a modified fault classifier, applying the modified fault classifier to at least one additional set of signals acquired by at least one sensor of the first plurality of sensors and emanating from at least one given mechanical machine sharing the at least one characteristic, the modified fault classifier being (Continued)

configured to automatically identify at least one fault of the at least one given mechanical machine based on the at least one additional set of signals, and providing a human sensible output, by an output device, including at least identification of the fault of the at least one given mechanical machine, at least one of a repair or maintenance operation being performed based on the human sensible output.

22 Claims, 10 Drawing Sheets

(56) References Cited

U.S. PATENT DOCUMENTS

| | | | |
|---|---|---|---|
| 2016/0291552 | A1 | 10/2016 | Pal et al. |
| 2016/0350671 | A1* | 12/2016 | Morris, II .......... G05B 23/0229 |
| 2017/0083830 | A1 | 3/2017 | Bates et al. |
| 2017/0300605 | A1 | 10/2017 | Ardis et al. |
| 2018/0120265 | A1 | 5/2018 | Yoskovitz et al. |
| 2018/0197111 | A1 | 7/2018 | Crabtree et al. |
| 2019/0130659 | A1* | 5/2019 | Ide ........................ G07C 5/006 |

OTHER PUBLICATIONS

An International Preliminary Report on Patentability dated Mar. 8, 2022, which issued during the prosecution of Applicant's PCT/IL2020/050958.

* cited by examiner

SENSOR-AGNOSTIC MECHANICAL MACHINE FAULT IDENTIFICATION

CROSS-REFERENCE TO RELATED PATENT APPLICATIONS

This application is a U.S. National Stage Application under 35 U.S.C. § 371 of International Patent Application No. PCT/IL2020/050958 filed Sep. 3, 2020, which claims the benefit of U.S. Provisional Application No. 62/895,247 filed on Sep. 3, 2019, both of which are incorporated by reference in their entireties. The International Application was published on Mar. 11, 2021, as International Publication No. WO/2021/044418 A1.

FIELD OF THE INVENTION

The present invention relates generally to the monitoring of mechanical machines and more particularly to the identification of faults of mechanical machines by the monitoring thereof.

BACKGROUND OF THE INVENTION

Various systems and methods for fault identification of mechanical machines are known in the art.

SUMMARY OF THE INVENTION

The present invention seeks to provide novel systems and methods for the use of transfer learning between different types of sensors monitoring signals emanating from mechanical machines, for the purpose of fault identification and maintenance of the monitored mechanical machines.

There is thus provided in accordance with a preferred embodiment of the present invention a method for identifying a fault of at least one mechanical machine, including causing a first plurality of sensors coupled to a corresponding first plurality of mechanical machines to acquire a first plurality of sets of signals emanating from the first plurality of mechanical machines, the first plurality of mechanical machines sharing at least one characteristic, supplying at least the first plurality of sets of signals of the first plurality of mechanical machines to a pre-existing fault classifier previously trained to automatically identify faults of a second plurality of mechanical machines based on signals emanating therefrom and previously acquired by a second plurality of sensors, the second plurality of sensors being of a different type than the first plurality of sensors, the second plurality of mechanical machines sharing the at least one characteristic, modifying the pre-existing fault classifier by employing transfer learning, based at least on the first plurality of sets of signals of the first plurality of mechanical machines, thereby providing a modified fault classifier, applying the modified fault classifier to at least one additional set of signals acquired by at least one sensor of the first plurality of sensors and emanating from at least one given mechanical machine sharing the at least one characteristic, the modified fault classifier being configured to automatically identify at least one fault of the at least one given mechanical machine based on the at least one additional set of signals, and providing a human sensible output, by an output device, including at least identification of the fault of the at least one given mechanical machine, at least one of a repair or maintenance operation being performed based on the human sensible output.

In accordance with one preferred embodiment of the present invention, the method also includes following the causing the first plurality of sensors to acquire the first plurality of sets of signals and prior to the supplying the first plurality of sets of signals to the pre-existing fault classifier: obtaining a first plurality of sets of operational condition data for mechanical machines of the first plurality of mechanical machines, each set of operational condition data indicating a state of operation of a mechanical machine of the first plurality of mechanical machines, each state of operation being associated with a least one of the sets of signals, the supplying at least the first plurality of sets of signals to the pre-existing fault classifier also including supplying the operational condition data of the first plurality of mechanical machines to the pre-existing fault classifier, the modifying the pre-existing fault classifier by employing transfer learning, based at least on the first plurality of sets of signals also including modifying the pre-existing fault classifier by employing transfer learning, additionally based on the first plurality of sets of operational condition data of the first plurality of mechanical machines.

Preferably, the identification of the fault includes identification of a specific fault of the at least one given mechanical machine and a prediction of failure of the at least one given mechanical machine due to the specific fault in the absence of performance of a recommended maintenance operation thereupon, wherein the at least one given mechanical machine would indeed fail in the absence of performance of the recommended maintenance operation.

Preferably, the pre-existing fault classifier includes a neural network and the modifying the pre-existing fault classifier includes adding at least one mapping layer to the neural network, the neural network being otherwise unmodified by the modifying, besides the addition of the at least one mapping layer.

Preferably, the neural network including the pre-existing fault classifier includes a data layer and an input layer for receiving data from the data layer, the at least one mapping layer being added between the data layer and the input layer, whereby the at least one mapping layer is configured to receive the data from the data layer in the modified fault classifier.

Preferably, the first plurality of sensors has a first frequency response distribution and the second plurality of sensors has a second frequency response distribution, the mapping layer being configured to map between the first and second frequency response distributions.

In accordance with one preferred embodiment of the method of the present invention, the first plurality of sensors is operative to sense a same type of signal as sensed by the second plurality of sensors.

Preferably, the same type of signal includes one of a vibration signal, a magnetic flux signal, a current, a temperature and an internal machine pressure signal.

In accordance with another preferred embodiment of the present invention, the first plurality of sensors and the second plurality of sensors are operative to sense mutually different types of signals.

Preferably, the mutually different types of signals include at least one of: vibration and magnetic flux signals, vibration and electric current signals, vibration and temperature signals, electric current and magnetic flux signals and vibration and internal machine pressure signals.

Preferably, at least some of the states of operation of a mechanical machine of the first plurality of mechanical machines, as indicated by the first plurality of sets of operational condition data, are states of faulty operation.

In accordance with yet another preferred embodiment of the present invention, the first plurality of sets of signals and the first plurality of sets of operational condition data of the first plurality of mechanical machines include less than 30 of the states of faulty operation.

There is additionally provided in accordance with another preferred embodiment of the present invention a system for identifying a fault of at least one mechanical machine, including a first plurality of sensors coupled to a corresponding first plurality of mechanical machines and operative to acquire a first plurality of sets of signals emanating from the first plurality of mechanical machines, the first plurality of mechanical machines sharing at least one characteristic, a data processing unit operative to: receive the first plurality of sets of signals of the first plurality of mechanical machines, the data processing unit including a pre-existing fault classifier previously trained to automatically classify states of operation of a second plurality of mechanical machines based on signals emanating therefrom and previously acquired by a second plurality of sensors, the second plurality of sensors being of a different type than the first plurality of sensors, the second plurality of mechanical machines sharing the at least one characteristic, modify the pre-existing fault classifier by employing transfer learning, based at least on the first plurality of sets of signals of the first plurality of mechanical machines, thereby providing a modified fault classifier, and apply the modified fault classifier to at least one additional set of signals acquired by at least one sensor of the first plurality of sensors and emanating from at least one given mechanical machine sharing the at least one characteristic, the modified fault classifier being configured to automatically identify at least one fault of the at least one given mechanical machine based on the at least one additional set of signals, and an output device in communication with the data processing unit and operative to provide a human sensible output including at least identification of the fault of the at least one given mechanical machine, at least one of a repair or maintenance operation being performed based on the human sensible output.

In accordance with one preferred embodiment of the present invention, the system also includes a data collection unit operative to obtain a first plurality of sets of operational condition data for mechanical machines of the first plurality of mechanical machines, each set of operational condition data indicating a state of operation of a mechanical machine of the first plurality of mechanical machines, each state of operation being associated with a least one of the sets of signals, the data processing unit being operative to receive the operational condition data of the first plurality of mechanical machines and to modify the pre-existing fault classifier additionally based on the first plurality of sets of operational condition data of the first plurality of mechanical machines.

Preferably, the identification of the fault includes identification of a specific fault of the at least one given mechanical machine and a prediction of failure of the at least one given mechanical machine due to the specific fault in the absence of performance of a recommended maintenance operation thereupon, wherein the at least one given mechanical machine would indeed fail in the absence of performance of the recommended maintenance operation.

Preferably, the pre-existing fault classifier includes a neural network and modification of the pre-existing fault classifier includes adding at least one mapping layer to the neural network, the neural network being otherwise unmodified by the modification, besides the addition of the at least one mapping layer.

Preferably, the neural network including the pre-existing fault classifier includes a data layer and an input layer for receiving data from the data layer, the at least one mapping layer being added between the data layer and the input layer, whereby the at least one mapping layer is configured to receive the data from the data layer in the modified fault classifier.

Preferably, the first plurality of sensors has a first frequency response distribution and the second plurality of sensors has a second frequency response distribution, the mapping layer being configured to map between the first and second frequency response distributions.

In accordance with one preferred embodiment of the system of the present invention, the first plurality of sensors is operative to sense a same type of signal as sensed by the second plurality of sensors.

Preferably, the same type of signal includes one of a vibration signal, a magnetic flux signal, a current, a temperature and an internal machine pressure signal. In accordance with another preferred embodiment of the system of the present invention, the first plurality of sensors and the second plurality of sensors are operative to sense mutually different types of signals.

Preferably, the mutually different types of signals include at least one of: vibration and magnetic flux signals, vibration and electric current signals, vibration and temperature signals, electric current and magnetic flux signals and vibration and internal machine pressure signals.

Preferably, at least some of the states of operation of a mechanical machine of the first plurality of mechanical machines, as indicated by the first plurality of sets of operational condition data, are states of faulty operation.

In accordance with yet another preferred embodiment of the system of the present invention, the first plurality of sets of signals and the first plurality of sets of operational condition data of the first plurality of mechanical machines include less than 30 of the states of faulty operation.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
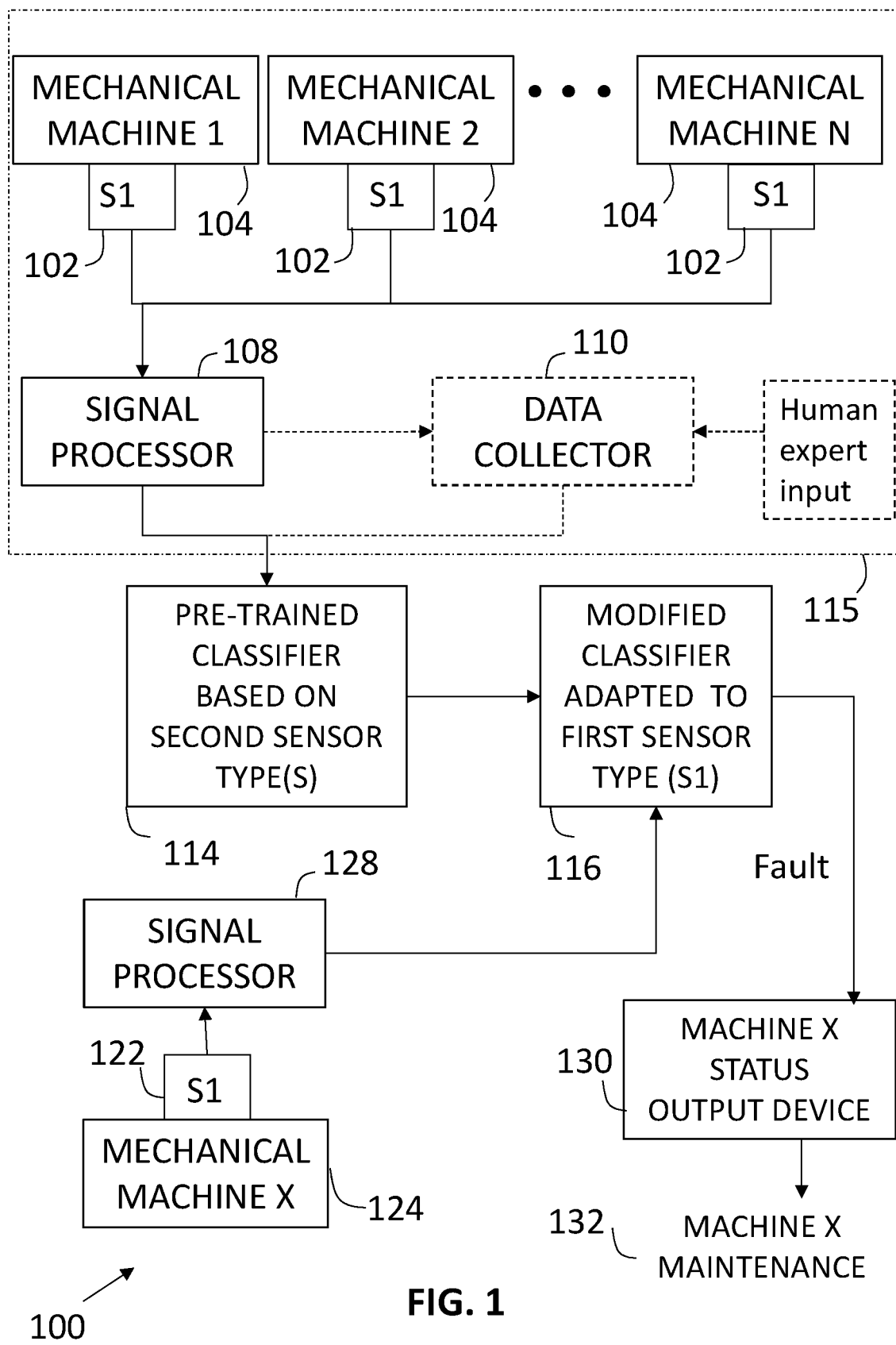
FIG. 1 is a simplified, high level block diagram illustrating a system for mechanical machine fault identification, constructed and operative in accordance with a preferred embodiment of the present invention.

Reference is now made to FIG. 1, which is a simplified, high level block diagram illustration of a system for mechanical machine fault identification, constructed and operative in accordance with a preferred embodiment of the present invention.

Figure 2:
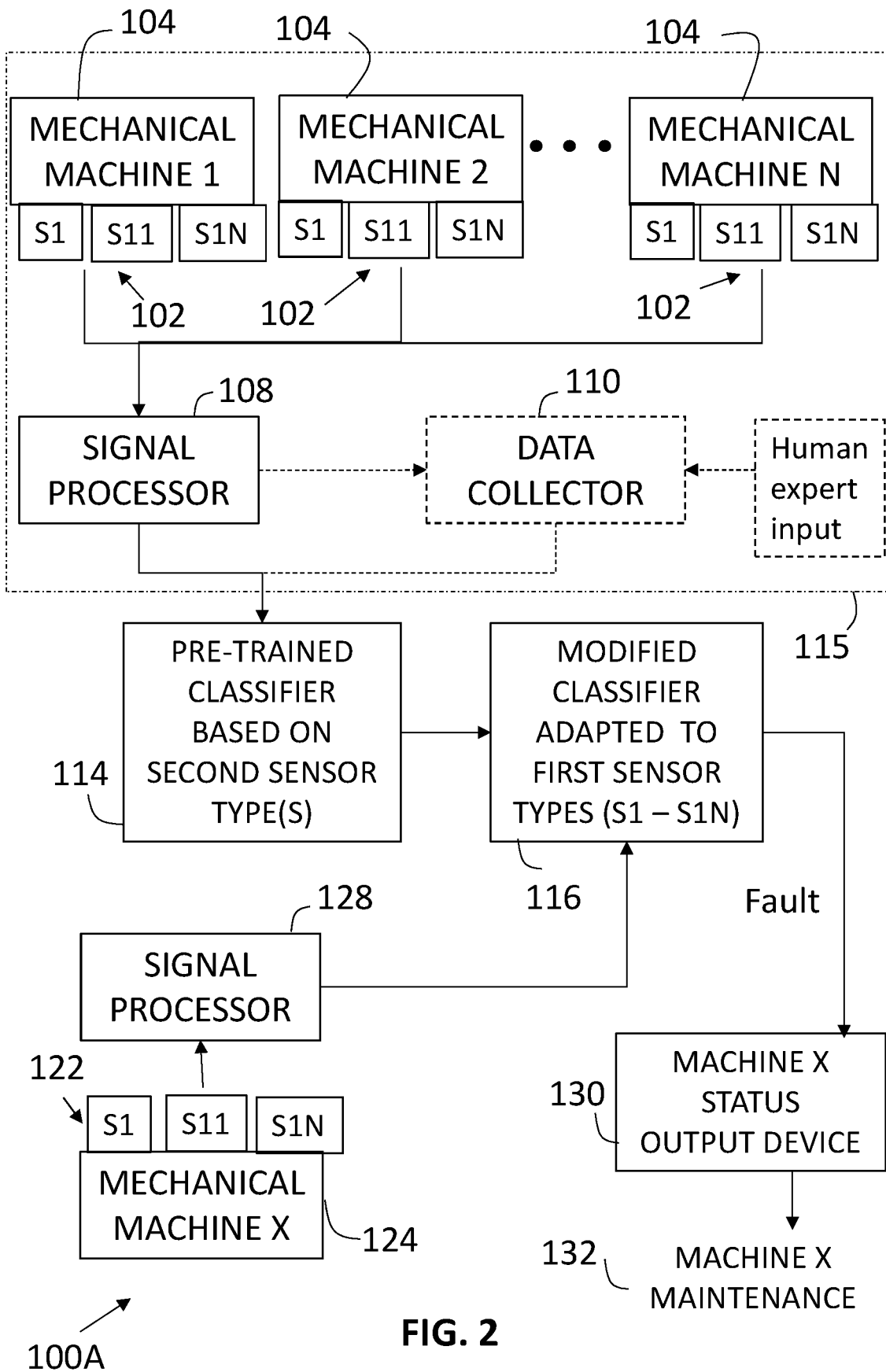
FIG. 2 is a simplified, high level block diagram illustrating a system for mechanical machine fault identification, constructed and operative in accordance with another preferred embodiment of the present invention.

As seen in FIG. 1, there is provided a system 100 for mechanical machine fault identification. System 100 preferably includes a first plurality of sensors 102 of a first type, here indicated as sensor type S1. All of sensors 102 may be of the same type e.g. sensor type S1 as shown here. Alternatively, first plurality of sensors 102 may include more than one type of sensor e.g. sensors types S1, S11 through to S1N, as shown in FIG. 2, described in greater detail henceforth. Sensors 102 are preferably coupled to a corresponding first plurality of mechanical machines 104. Here, by way of example, first plurality of mechanical machines 104 is shown to include mechanical machines 1, 2 through to N, where N may be any number of mechanical machines, such as two or more mechanical machines. Typically, sensors 102 are coupled to mechanical machines 104 in a one-to-one corresponding arrangement, with one of sensors 102 coupled to a corresponding one of machines 104. However, other arrangements are also possible, wherein a single sensor may be arranged to sense signals from more than one of mechanical machines 104. Sensors 102 may be physically contacting machines 104, such as directly or indirectly mounted on machines 104. Sensors 102 may alternatively be physically separated from machines 104, such as located at a given distance from machines 104, for example in the case that sensors 102 are optical sensors.

Sensors 102 may be embodied as any type of sensing device operative to sense signals emanating from mechanical machines 104. Machines and mechanical systems with moving parts, such as machines including bearings, rotors or shafts, or motors, engines, compressors, pumps, fans, gear boxes, chillers, etc., may generate signals during the operation thereof. Mechanical machines 104 may be of any of the aforementioned types of mechanical systems or of other types of mechanical systems generating signals during the operation thereof. Sensors 102 are preferably operative to sense such signals. Analysis of the sensed signals may be used to ascertain a condition of the machine from which the sensed signal emanated and in some cases to ascertain a fault of the machine from which the signal emanated. By way of non-limiting example only, sensors 102 may all be the same type of vibration sensors, such as all be single-axis accelerometers or all be multi-axis accelerometers, for sensing vibrations emanating from machines 104; sensors 102 may all be the same type of magnetic flux sensors sensing magnetic flux emanating from machines 104; sensors 102 may all be the same type of electric current sensors sensing variation in electric currents generated by machines 104; sensors 102 may all be the same type of temperature sensors sensing heat generated by machines 104. It is understood that sensors 102 may alternatively all be of the same type of any other sort of sensing device, capable of sensing signals emanating from and generated by machines 104, including signals associated with machine operation such as torque, displacement, input line frequency etc. Sensors 102 may alternatively comprise two or more types of sensors, such as, by way of example only, magnetic flux sensors and vibration sensors.

Mechanical machines 1-N which are members of the first plurality of mechanical machines 104 are preferably characterized by one or more shared characteristics. Mechanical machines 1-N may or may not be the same machines, provided that they have in common at least one shared characteristic. For example, shared characteristics may refer to type, model number, manufacturer, physical characteristics or dimensions, operating characteristics or parameters, or other shared characteristics that indicate that an observed behavior of one of the mechanical machines of the plurality of mechanical machines may be typical of another mechanical machine of the plurality of mechanical machines.

First plurality of sensors 102 is preferably operative to acquire a first plurality of sets of signals emanating from the first plurality of mechanical machines 104. The sets of signals may be 'signal snapshots' sensed by an appropriate one of sensors 102 for a short time period. For example, the signal may be sensed for a period of a few seconds, such as one—four seconds. Each set of signals may alternatively comprise multiple 'signal snapshots' over time, for example four second 'signal snapshots' measured each hour over a period of several hours, days or even months. Alternatively, each set of signals may comprise continuously monitored signals over a longer period or more than one period of time. For example, the signal may be monitored every millisecond, continuously.

Signals acquired by sensors 102 may be pre-processed, for example by an analog or digital processing capability of the sensor 102 itself or by other hardware and/or software signal processing components 108. It is understood that although signal processor 108 is shown in FIG. 1 as a separate element from sensors 102, signal processing functionality may be incorporated within one or more of sensors 102. Signal pre-processing may involve at least one of digitization, compression, feature extraction and representation of the signal in the time or frequency domain.

In one embodiment of the present invention, sets of signals acquired by first plurality of sensors 102 may be uploaded to a remote server, such as a server in the cloud. Signal processing functionality 108 may be carried out at the remote server. Preferably, the sets of signals acquired by first plurality of sensors 102 are accumulated as they are acquired from the first plurality of machines 104. For example, the sets of signals may be accumulated at the server in the cloud.

System 100 may optionally include a data collection unit 110. Data collection unit 110 may be operative to receive a first plurality of sets of operational condition data for mechanical machines of the plurality of mechanical machines 104, each set of operational condition data indicating a state of operation of a mechanical machine of the first plurality of mechanical machines 104, each state of operation being associated with a least one of the sets of signals acquired by the first plurality of sensors 102.

The operational condition data collected at data collection unit 110 is preferably in the form of machine condition diagnoses supplied by human experts, such as engineers. The sets of signals acquired by first plurality of sensors 102 may optionally be provided to data collection unit 110, either by signal processor 108 and/or directly or indirectly by sensors 102. Human experts may optionally analyze the sets of signals acquired by the first plurality of sensors 102 and label each set of signals of the sets of signals as representing particular states of operation of the corresponding mechanical machine 104 from which the signals emanated. The human experts may interact with a user interface, for example of the data collection unit 110 or of another device that enables communication between the human expert and the data collection unit 110, to enter the operational state data. The signals and the labels applied thereto may be accumulated and stored in a data base in data collection unit 110. In one embodiment of the present invention, data collection unit 110 may be located in a remote server, such as a server in the cloud.

Identification of faults by the human experts may include identification of one or more specific faults of the monitored machine 104. Depending on the specific machine 104 being monitored, the specific fault identified may include bearing wear of a rotating machine, mechanical looseness, misalignment, unbalancing, electrical faults or other faults. Identification of faults may alternatively include identification of a machine 104 being in a faulty state i.e. an anomalous state with respect to the normal, healthy operating state thereof, but without identifying a specific fault. In this case, the human expert fault identification identifies the machine as not operating in a healthy manner but does not identify what is the specific cause of the unhealthy operation.

Irrespective of whether the particular states of operation represented by the signals are or are not labeled by human experts, the sets of signals acquired by sensors 102 may include both sets of signals corresponding to healthy, non-faulty states of operation of machines 104 and sets of signals corresponding to unhealthy, faulty states of operation of machines 104.

Alternatively, the sets of signals acquired by sensors 102 do not necessarily include sets of signals corresponding to unhealthy faulty states of operation of machines 104. In accordance with this embodiment of the present invention, machines 104 being monitored by sensors 102 may all be in a healthy operational condition. The sets of signals and optionally associated states of machine operation may therefore all correspond to healthy states of machine operation.

The sets of signals, as accumulated from first plurality of machines 104, are preferably supplied to a pre-existing fault classifier 114 included in system 100. In the case that system 100 also includes data collection unit 110 and the signals are labelled, the labelled signals are preferably combinedly provided by signal pre-processor 108 and data collection unit 110, to pre-existing fault classifier 114.

Pre-existing fault classifier 114 may be an algorithmic classifier. For example, the pre-existing fault classifier 114 may be stored a remote server. System 100 may include a non-transitory computer readable storage medium having stored thereupon computer executable instructions for executing, by a processor, the functionality of the pre-existing fault classifier 114. The one or more processors executing pre-existing fault classifier 114 may be remote processors, for example located in the cloud, or may be local processors.

Pre-existing fault classifier 114 is preferably a fault classifier that has been previously trained to automatically identify faults of a second plurality of mechanical machines based on signals emanating therefrom and previously acquired by a second plurality of sensors, the second plurality of sensors being of a different type than the first plurality of sensors 102. The second plurality of sensors may all be of the same type as each other, which type may be different than the type or types of sensors of first plurality of sensors 102. The second plurality of sensors may alternatively all be of the same type as each other, which type may be different than at least one of the types of sensors of first plurality of sensors 102. The second plurality of sensors may alternatively comprise more than one type of sensor, which types may all be different types than the sensor or sensors of first plurality of sensors. The second plurality of sensors may alternatively comprise more than one type of sensor, which types may be different types than at least one of the types of sensors of first plurality of sensors 102. The second plurality of mechanical machines preferably shares the at least one mechanical characteristic shared by first plurality of mechanical machines 104.

It is understood that fault classifier 114 is termed here 'pre-existing' because it may be pre-existing with respect to the sets of signals and optional operational condition data acquired by sensors 102 from machines 104. Fault classifier 114 may have been previously generated at an earlier point in time, prior to the generation of the data set comprising the sets of signals and optional operational condition data of machines 104.

Preferably, fault classifier 114 is an accurate classifier, configured to accurately identify faults in mechanical machines sharing the at least one common characteristic, based on signals acquired by the second plurality of sensors. Fault classifier 114 may be such an accurate classifier due to having been previously trained, using machine learning, on a large data set comprising signals and possibly associated operational condition data acquired from a large number of machines. As is well known by those skilled in the art, the greater the volume of data supplied to a machine learning fault classifier for the purpose of training thereof, the more accurately the classifier may perform, up to a given limit. For example, fault classifier 114 may have been trained using data sensed from over 40,000 individual rotating machines, including motors, pumps, fans, chillers, compressors and gear boxes. The common characteristic shared by such machines may be the inclusion of bearings therein. An example of how fault classifier 114 may have been previously trained in shown in FIGS. 3-4B, described henceforth.

Pre-existing fault classifier 114 may therefore be successfully applied to signals emanating from mechanical machines having a shared characteristic with the mechanical machines based on data from which fault classifier 114 was trained, in order to identify faults thereof. However, it is noted that fault classifier 114 was previously trained based on signals acquired by a specific type or types of sensor, namely a second plurality of sensors, of a different type than first plurality of sensors 102. As a result, fault classifier 114 is capable of classifying and identifying faults most successfully when applied to signals acquired by the specific sensors based on which fault classifier 114 was trained. However, in the case that the signals supplied to fault classifier 114 are acquired by different types of sensors than the second plurality of sensors based on which fault classifier 114 was trained, fault classifier 114 will not be capable of accurately classifying and identifying faults based on these signals. This is because of the difference in sensor characteristics between the sensors i.e. the second plurality of sensors, based on which fault classifier 114 was trained and the sensors, for example the first plurality of sensors S1 or first plurality of sensors S1-S1N (FIG. 2), having acquired a present signal requiring classification.

Even should fault classifier 114 be a highly accurate classifier for identifying faults based on signals acquired by the second plurality of sensors, fault classifier is therefore of limited, if any, use in identifying faults acquired by different types of sensors e.g. first plurality of sensors S1 or S1-S1N (FIG. 2). Should fault classifier 114 be applied to the signals acquired by the first plurality of sensors, the results would not be accurate.

This may be exemplified by reference to the case of two types of vibration sensors, such as a tri-axial accelerometer and single-axis accelerometer, sensing vibration signals generated by a mechanical machine. The two types of vibration sensors differ from each other in various parameters such as geometry, mass, internal materials, etc. leading to differences in the moments of inertia and resonance frequencies of the respective sensors. As a result, the sensors have mutually different frequency responses. A particular signal generated by a mechanical machine being monitored will be differently sensed and recorded by the two sensors, due to the innate differences between the sensors. Moreover, if the two sensors are mounted at different locations on the machine being monitored thereby, this difference will be even further exacerbated due to the sensors measuring along mutually different measurement axes and due to different vibration levels measured due to the difference in location.

For example, in the case of a tri-axial accelerometer and a single-axis accelerometer being mounted on a cylindrical machine, the two types of accelerometers will measure mutually different vibration levels, since the tri-axial accelerometer will measure radial vibration along one axis and tangential vibration along two axes whereas the single-axis accelerometer will measure radial, or direct, vibration.

Consequently, the use of a fault detection classifier trained with signals acquired from one type of sensor e.g. vibration signals acquired by a tri-axial accelerometer, will lead to improper classification results when applied to the same type of signals acquired by a different type of sensor e.g. vibration signals acquired by a single-axis accelerometer.

This may be further exemplified by reference to a more extreme case of two types of sensors sensing different types of signals, such as a vibration sensor and a magnetic flux sensor, respectively sensing vibration and magnetic flux signals emanating from a particular mechanical machine. A fault detection classifier trained using data acquired by one of the types of sensors e.g. vibration signals acquired by the vibration sensor, will be limited to classifying vibration signals and will provide poor results of little relevance if applied to identify faults in, for example, magnetic flux signals generated by the same machine.

In order to provide a fault classifier capable of accurately classifying signals acquired by a different type of sensor to that based on which the fault classifier was previously trained, an entirely new fault classifier may be trained based on signals acquired by the different type of sensor e.g. first plurality of sensors S1 or S1, S11 through to S1N (FIG. 2). In this case, the pre-existing fault classifier 114 is not made use of and a new fault classifier is developed in order to identify faults of mechanical machines such as machines 104. However, in order for this new classifier to provide accurate fault identification, a large volume of new data acquired by the different type of sensors e.g. first plurality of sensors S1 or first plurality of sensors S1-S1N (FIG. 2), must be supplied thereto and the fault classifier must be trained based on this. Such a process may be lengthy and such a large volume of data may not be available. Additionally, such a process is also highly limited in performance and scope of applicability, due to the many parameters controlling the frequency dependence of machine signals, such as sensor mounting location, orientation, mounting type etc. Furthermore, in this approach, the capability of the original pre-existing fault classifier 114 is simply wasted, rather than harnessed, since the previous fault classifier 114 is not applied at all.

The present invention advantageously provides a solution to the problem of a fault classifier trained on data acquired from a certain type or types of sensor being of limited, if any, use in classifying signals acquired from a different type or types of sensor, due to the difference in sensor characteristics. Advantageously, the present invention does not require the training 'from scratch' of a new classifier based on signals from the different type of sensor. Rather, the present invention makes use of a transfer learning approach for mapping between the original sensor type(s) based on which the pre-existing classifier was trained and the new, different sensor type(s) from which new data, requiring classification, is obtained.

The present invention may utilize the pre-existing classifier 114 by modifying the pre-existing classifier 114 based on mapping between the different sensor frequency response distributions of the respective different sensor types and requires only a small data set from the different type of sensors e.g. first plurality of sensors 102, in order to perform such mapping and modification. In a preferred embodiment of the present invention, a modified classifier may thus be generated, based on the original pre-existing classifier 114 and a small new data set acquired from a type or types of sensor different than the type or types of sensor on which the pre-existing classifier 114 was based. This modified classifier may be capable of accurately identifying faults in signals acquired by the different type of sensors e.g. first plurality of sensors 102, despite the small data set supplied thereto. The modified classifier harnesses the original pre-existing classifier 114 and maps it to the different type of sensors e.g. first plurality of sensors 102, so as to be accurately applicable to the signals acquired by the different type of sensors.

It is noted, however, that the present invention may be of use even in the case of the availability of a large, high quality data set from the different type of sensors e.g. first plurality of sensors 102. Although in this case, since a large, high quality data set is available a new dedicated classifier may be trained to provide adequate results, the use of transfer learning to modify a pre-existing classifier may still be advantageous, in order to take advantage of the capabilities of the original pre-existing classifier. Thus, although the present invention is expected to be most useful cases where sufficient data, in terms of quantity and/or quality, is not available in order to train a new classifier, the present invention may also be useful in the case that a large, high quality data set is available.

In the case of a pre-existing accurate fault classifier trained using signals acquired by a specific type or types of sensors, the present invention thus provides a solution for modifying the classifier so as to capable of accurately classifying signals acquired by any other type or types of sensors different from the specific type or types of sensors based on which the fault classifier was trained, where these signals emanate from machines have at least one shared characteristic with those machines based on which the classifier was previously trained. This may be termed a sensor-agnostic approach, where the classifier may be calibrated so as to be capable of being applied to data acquired by any sensor, regardless of the type and/or structure of the source data collected by the sensor.

Figure 5A:
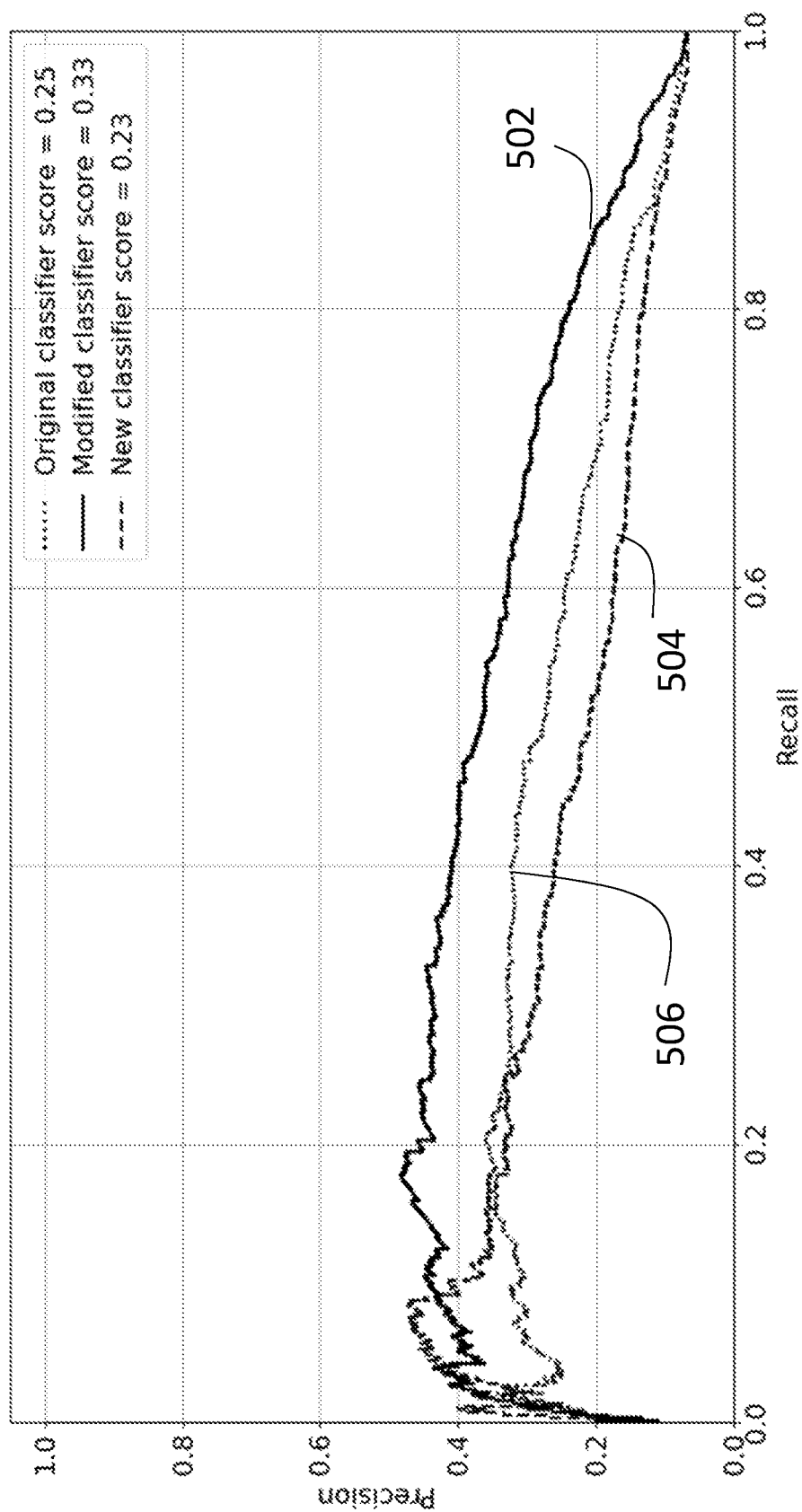
FIGS. 5A-5D are graphs showing performance of a system of the type shown in FIG. 1 or FIG. 2 for fault identification of mechanical machines.
Figure 5B:
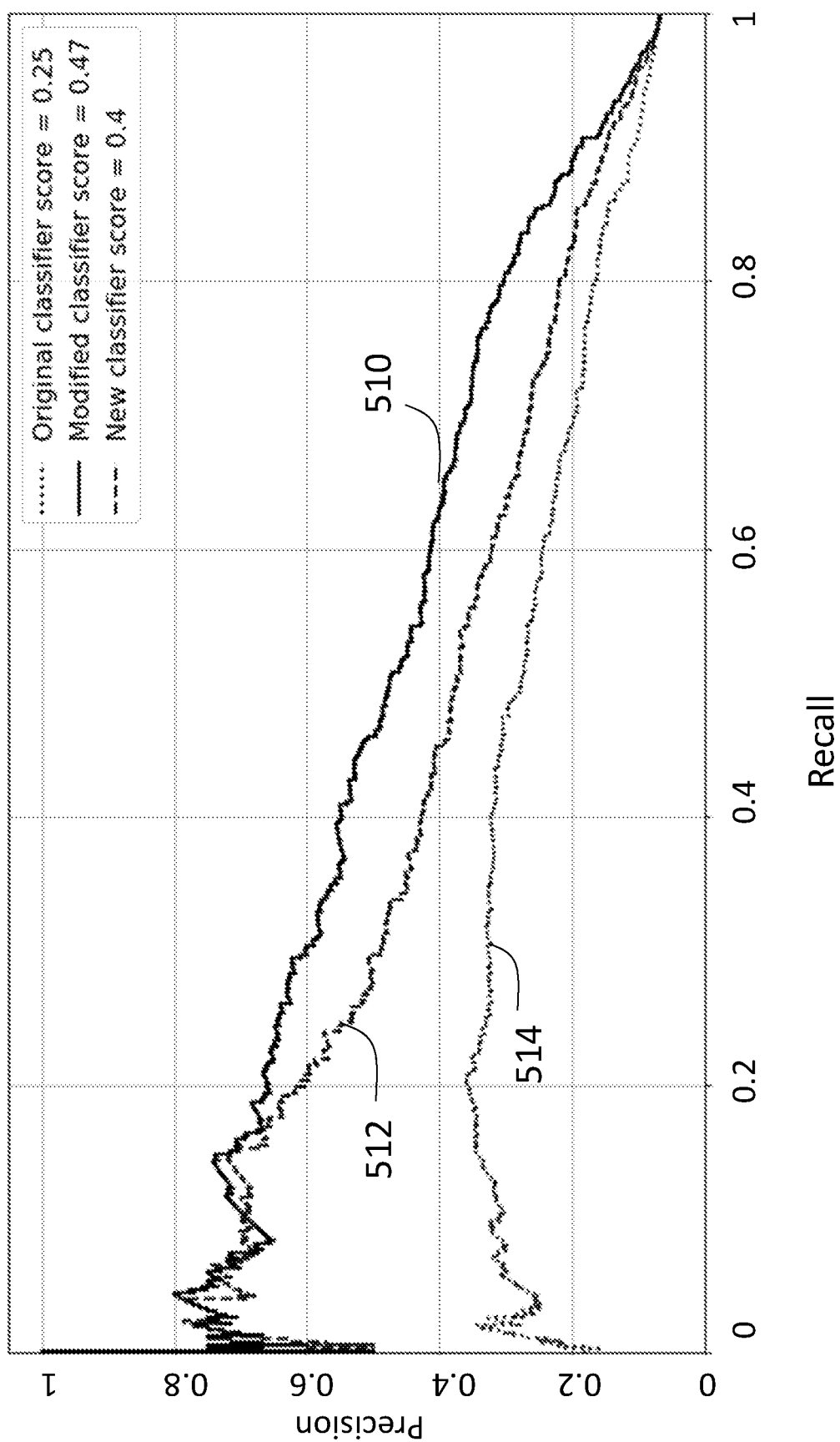
Figure 5C:
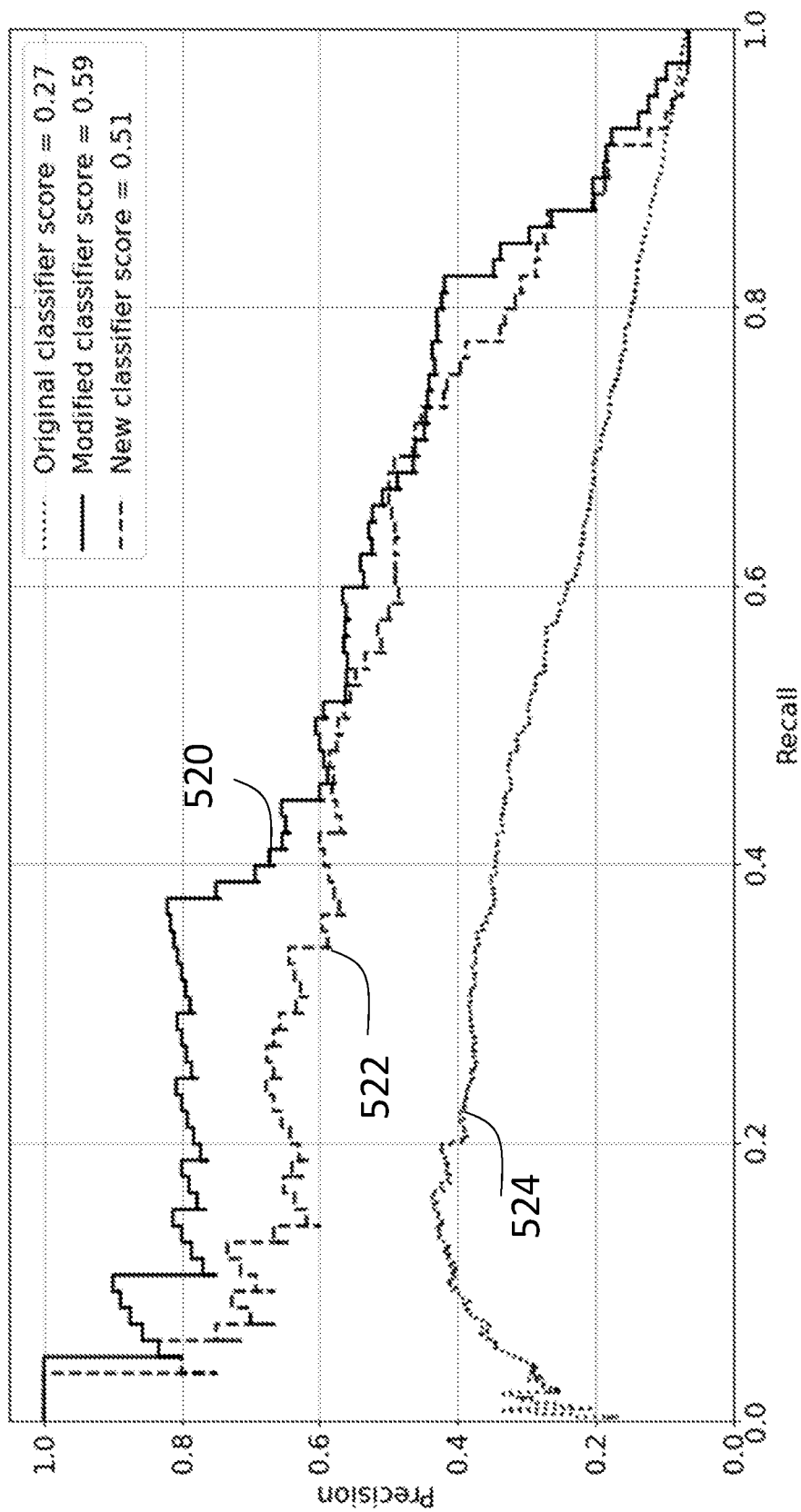
Figure 5D:
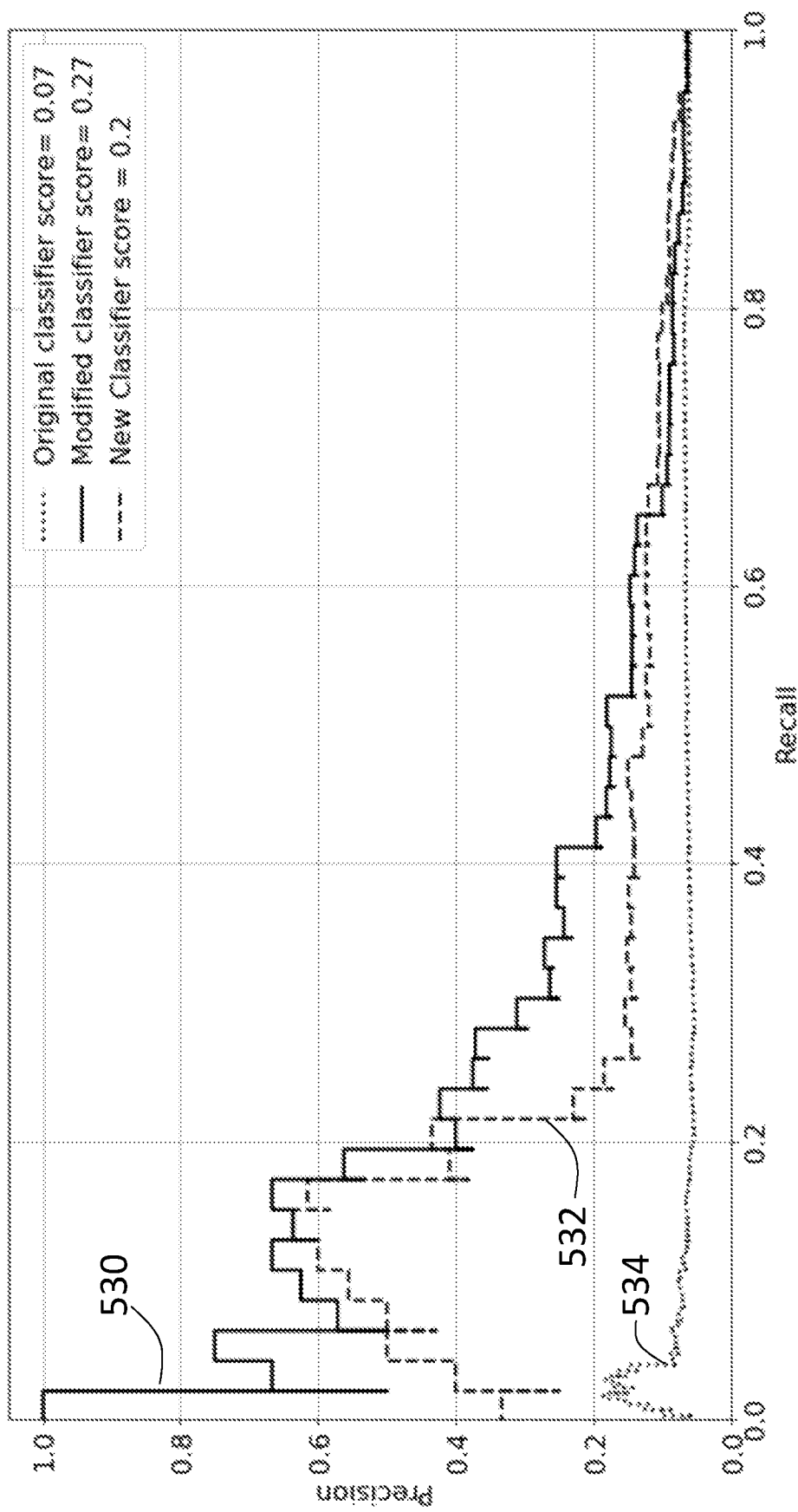

The approach of the present invention may be applicable in the case of the same type of signal e.g. vibration signals, acquired by different types of vibration sensors. Results for this are shown in FIGS. 5A-5C. The approach of the present invention may also be applicable in the case of a different type of signal e.g. vibration and magnetic signals, acquired by different types of sensors, e.g. vibration sensors and magnetic flux sensors. Results for this are shown in FIG. 5D.

In both cases, the original pre-existing classifier may be modified based on mapping between the sensor frequency response distributions, in order to create a modified classifier capable of identifying faults in the signals acquired by the sensors of a different type than those based on which the pre-existing classifier was trained. In both cases the modified classifier may be applied to the signals acquired by the sensors of a different type than those based on which the pre-existing classifier was trained, with a greater accuracy than would be achieved by applying the pre-existing classifier in its original, unmodified form. Furthermore, in both cases the modified classifier may be applied to the signals acquired by the sensors of a different type than those based on which the pre-existing classifier was trained, with a greater accuracy than would be achieved by applying a new classifier, trained using only the signals acquired by the sensors of a different type.

The acquisition of a small new data set from the different type of sensors e.g. first plurality of sensors 102, has been described hereinabove with respect to sensors 102 acquiring signals and optional associated operational condition data from machines 104. The acquisition of a small data set by the system of FIG. 1 is preferably carried out by those elements enclosed in a dashed box 115.

In the embodiment of the invention shown in FIG. 1, first plurality of sensors 102 is preferably all the same type of sensor ie. sensor type S1. However, as mentioned previously, first plurality of sensors 102 may alternatively include more than one type of sensor. FIG. 2 shows an alternative embodiment of system 100, here indicated as system 100A, showing the inclusion in first plurality of sensors 102 of more than one type of sensor. Turning now to FIG. 2, first plurality of sensors 102 may include sensors S1, S11 to S1N on each of machines 1-N of plurality of machines 104. It is understood that first plurality of sensors 102 may include any number of sensors S1 through to S1N, such as two or more sensors. These sensors may be, for example, a combination of vibration sensors, magnetic flux sensors, current sensors, temperature sensors, or sensors for sensing other parameters associated with the operation of machines 104, such as torque, displacement, input line frequency etc. Sensors S1, S11 through to S1N may be of mutually different types to each other, but are preferably of the same types with respect to the sets of sensors coupled to each of machines 104. However, it is understood that system 100A may tolerate the case of some missing data from ones of the sensors 102, which missing data may be imputed, for example, by using multivariate statistics.

System 100A may generally resemble system 100 with the exception of the multiple types of sensors included in first plurality of sensors 102 in system 110A, and the description of system 100 generally also applies to system 100A.

With continued reference to FIGS. 1 and 2, the small new data set, based on which the pre-existing classifier 114 may be modified by mapping learning to provide a modified classier, may include much less data than the amount of data based on which pre-existing classifier 114 was originally trained. For example, the small new data set may comprise less than 400, less than 300, less than 200, less than 100, less than 50 or less than 30 sets of each of the first plurality of sets of signals and optionally the first plurality of sets of operational condition data of the first plurality of mechanical machines 104. Furthermore, within the small new data set may be an even smaller number of sets of signals corresponding to a state of faulty operation of a mechanical machine of first plurality of mechanical machines 104, such as less than 100, less than 90, less than 80, less than 70, less than 60, less than 50, less than 30 or less than 20 sets of signals corresponding to a state of faulty operation of a mechanical machine of first plurality of mechanical machines 104. As mentioned above, in some cases the small new data set may not even include signals corresponding to a state of faulty operation of a mechanical machine of first plurality of mechanical machines 104. This is in contrast to a much larger data set based on which the pre-existing classifier 114 may have been trained, such as several thousand samples.

It is appreciated that first plurality of sensors 102 is different from the second plurality of sensors based on which pre-existing classifier 114 was trained, but that machines 104 do preferably share a common characteristic both with each other and with the machines based on which pre-existing classifier 114 was trained. Machines 104 may be the same, or may not be the same, as those machines based on which the pre-existing classifier 114 was previously trained.

The first plurality of sets of signals acquired by first plurality of sensors 102 and optionally the first plurality of sets of operational condition data collected at data collection unit 110 of the first plurality of mechanical machines 104 may be supplied to pre-existing fault classifier 114. The first plurality of sets of signals may be pre-processed by signal processor 108 prior to the provision thereof to pre-existing fault classifier 114.

Pre-existing fault classifier 114 is then preferably modified based on the plurality of sets of signals and optionally the plurality of sets of operational condition data of the first plurality of mechanical machines 104, thereby producing a modified classifier 116.

Modified classifier 116 may be an algorithmic classifier executable by one or more processors, which may be the same or different processors as those executing pre-existing classifier 114. For example, pre-existing classifier 114 and modified classifier 116 may be embodied within a data processing unit. The one or more processors executing pre-existing fault classifier 116 may be remote processors, for example located in the cloud, or may be local processors. For example, the one or more processors executing modified classifier 116 may be located within ones of sensors 102.

Pre-existing fault classifier 114 is modified by adjusting the classifier to the new data set comprising the plurality of sets of signals acquired by sensors 102 and optionally the plurality of sets of operational condition data of the first plurality of mechanical machines 104. For example, as seen in FIG. 1, in the case that first plurality of sensors 102 includes only sensor type S1, modified classifier 116 may be adapted to sensor type S1. Further by way of example, as seen in FIG. 2, in the case that first plurality of sensors includes multiple sensor types S1, S11 etc, modified classifier 116 may be adapted to those multiple sensor types. By adjusting the pre-existing classifier 114 to produce a modified classifier 116, the classifier is calibrated so as to be applicable to a different data set than that data set based on which the classifier was originally trained. The adjustment involves mapping between the original sensor characteristics based on which the classifier 114 was previously trained and the sensor characteristics of first plurality of sensors 102.

In one embodiment of the present invention, the adjustment involves mapping between the sensor frequency response distribution of the original plurality of sensors based on which the classifier 114 was previously trained and the sensor frequency response distribution of first plurality of sensors 102. The mapping may be between sensor frequency response distributions, rather than simply sensor frequency responses, since the frequency responses both of the sensors based on which classifier 114 was previously trained and of the first plurality of sensors 102 may be distributed. This distribution may arise due to real world variation between the sensors within each plurality, such as variation in the machine characteristics, variation in the sensor location, sensor mounting, exact type of sensor mounting etc.

The mapping may be carried out in a supervised manner. In this embodiment, data collection unit 110 may be included in system 100 and labelled signals are supplied to pre-existing fault classifier 114. Further details pertaining to how pre-existing fault classifier 114 is modified by mapping between sensors in a supervised manner are provided henceforth with reference to FIG. 3.

The mapping may alternatively be carried out in an unsupervised manner. In this case, data collection unit 110 need not be included in system 100 and signals without associated operational states are supplied to pre-existing fault classifier 114. Pre-existing fault classifier 114 may be modified by unsupervised learning to map differences between the sensor frequency response distributions of the sensors based on which classifier 114 was previously trained and the new sensors e.g. first plurality of sensors 102.

The mapping may alternatively be carried out in a semi-supervised manner, wherein labelled signals are supplied to pre-existing fault classifier 114 and mapping between sensors in order to produce modified classifier 116 is carried out in an unsupervised manner. Further details relating to unsupervised mapping are provided henceforth, with reference to FIGS. 3-4B.

Modified classifier 116, having been adapted by mapping so as to be applicable to data from first plurality of sensors 102, is now ready for use for classifying signals acquired by sensors of the same type or types as first plurality of sensors 102.

An example of the employment of modified classifier 116 for identifying faults in signals acquired by a sensor of the same type as first plurality of sensors 102 is further shown in FIGS. 1 and 2. As seen in FIGS. 1 and 2, at least one sensor 122 e.g. sensor S1 in FIG. 1 and sensors S1-S1N in FIG. 2, may acquire at least one set of signals emanating from at least one given mechanical machine, here depicted as mechanical machine X, indicated by a reference number 124. Mechanical machine 124 may share at least one characteristic with first plurality of mechanical machines 104, as well as with the plurality of mechanical machines based on signals from which pre-existing fault classifier 114 was trained. Mechanical machine 124 may or may not be a member of first plurality of mechanical machines 104. It is understood that although mechanical machine 124 is shown here to be embodied as a single machine, this is for the sake of simplicity only, and system 100 may include any number of mechanical machines 124, such as one, two or more mechanical machines 124, which may or may not be the same as each other, provided that the machines 124 share the at least one characteristic, as described above.

At least one sensor 122 is one of first plurality of sensors 102, meaning that sensor 122 is of the same type as first plurality of sensors 102. As shown in FIG. 1, in the case that first plurality of sensors 102 includes a single type of sensor i.e. sensor S1, sensor 122 is also of sensor type S1. As shown in FIG. 2, in the case that first plurality of sensors 102 includes multiple types of sensor i.e. sensors S1 to S1N, at least one sensor 122 also comprises the same multiple types of sensors i.e. sensors S1-S1N. At least one sensor 122 is preferably operative to acquire at least one set of signals emanating from given mechanical machine 124. The sets of signals may be 'signal snapshots' sensed by at least one sensor 122 for a short time period. For example, the signal may be sensed for a period of a few seconds, such as one-four seconds. The sets of signals may alternatively comprise multiple 'signal snapshots' over time, for example four second 'signal snapshots' measured each hour over a period of several hours, days or even months. Alternatively, the sets of signals may comprise continuously monitored signals over a longer period or more than one period of time. For example, the signal may be monitored every millisecond, continuously.

Signals acquired by at least one sensor 122 may be pre-processed, for example by an analog or digital processing capability of the sensor 122 itself or by other hardware and/or software signal processing components 128. It is understood that although signal processor 128 is shown in FIGS. 1 and 2 as a separate element from at least one sensor 122, signal processing functionality may be incorporated within one or more of sensors 122. Signal pre-processing may involve at least one of digitization, compression, feature extraction and signal representation in the time or frequency domain.

In one embodiment of the present invention, signals acquired by at least one sensor 122 may be uploaded to a remote server, such as a server in the cloud. Signal processing functionality 128 may be carried out at the remote server.

The set of signals acquired by at least one sensor, here embodied by way of example as sensor 122, emanating from at least one given mechanical machine, here embodied by way of example as mechanical machine X, may be provided to modified classifier 116. Modified classifier 116 may be configured to automatically identify at least one fault of mechanical machine X, based on the set of signals emanating therefrom. It is understood that modified classifier 116 may be accurately applied to signals acquired by at least one sensor 122, due to modified classifier 116 having been adapted to classify signals acquired by sensors of the type of first plurality of sensors 102.

Identification of faults by modified classifier 116 may include identification of one or more specific faults of the monitored machine 104. Depending on the specific machine 104 being monitored, the specific fault identified may include bearing wear of a rotating machine, mechanical looseness, misalignment, unbalancing electrical faults or other faults.

Identification of faults may alternatively include identification of machine X being in a faulty state i.e. an anomalous state with respect to the normal, healthy operating state thereof, but without identifying a specific fault. In this case, the fault identification identifies the machine as not operating in a healthy manner but does not identify what is the specific cause of the unhealthy operation.

Systems 100 and 100A may additionally include an output device 130. Output device 130 may be operative to receive the fault identification output by modified classifier 116 and to provide a human sensible output including at least identification of the fault of at least one given mechanical machine 124. The human sensible output may include at least one of a visual, tactile, or audible output. Preferably, at least one of a repair or maintenance operation is performed based on said human sensible output.

For example, in the case that modified classifier 116 is executable by a remote processor, the fault identification output by modified classifier 116 may be communicated to output device 130.

Output device 130 may also be operative to provide a prediction of failure of at least one given mechanical machine 124 due to the fault identified by modified classifier 116, in the absence of performance of a recommended maintenance operation thereupon, wherein at least one given mechanical machine 124 would indeed fail in the absence of performance of the recommended maintenance operation.

In some cases, maintenance 132 may be performed upon given machine 124, responsive to the human sensible output provided by output device 130. Output device 130 may optionally be operatively coupled to a controller of machine 124 and operation of machine 124 may be adjusted responsive to the fault identification. For example, machine 124 may be switched off, may be operated at reduced power, or otherwise adjusted. Such adjustment may be automatic, or may be directed by a human expert in response to the human sensible output provided by output device 130.

Figure 3:
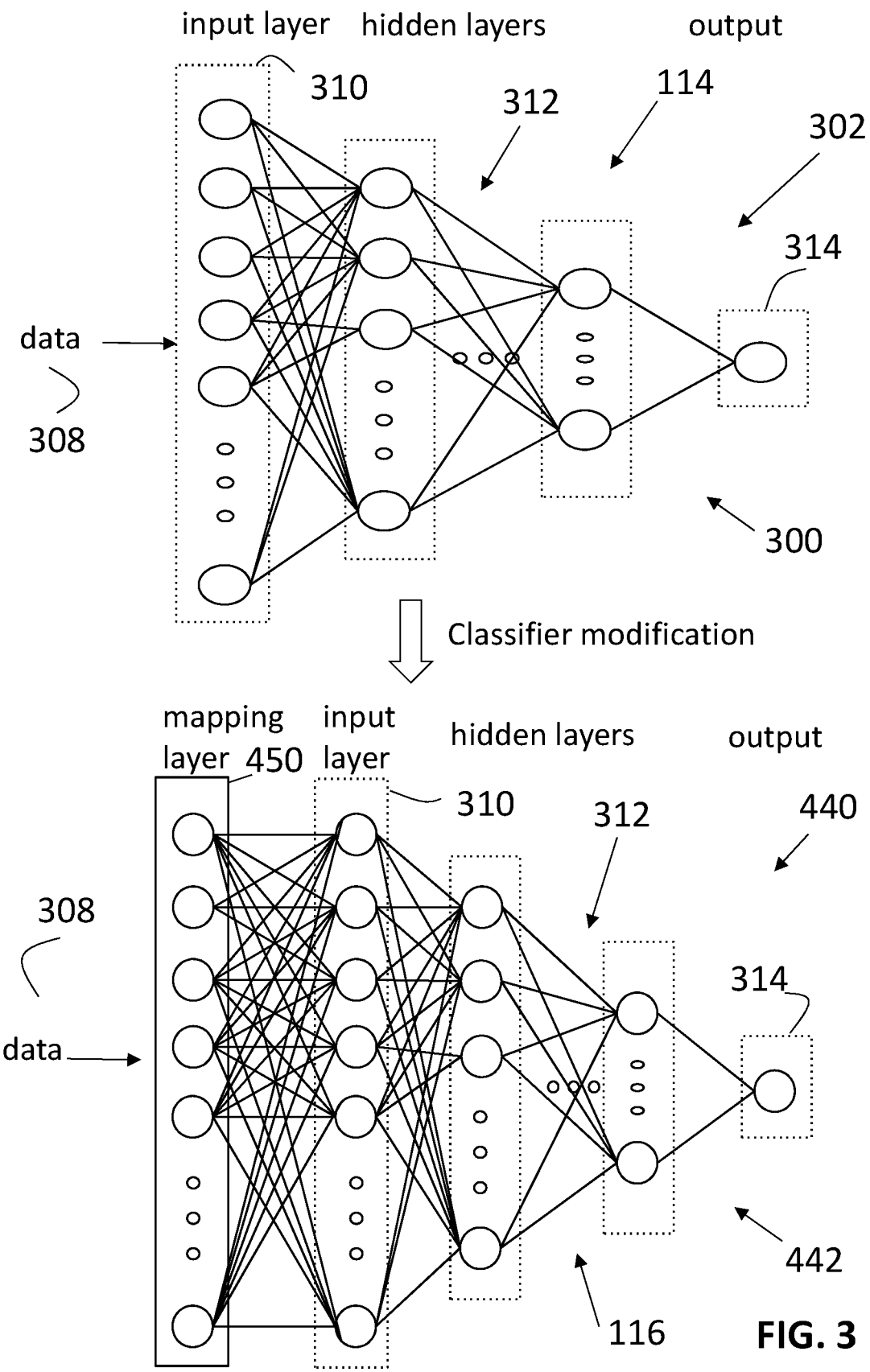
FIG. 3 is a simplified illustration of modification of a fault classifier, as carried out by a system of the type shown in FIG. 1 or FIG. 2.
Figure 4A:
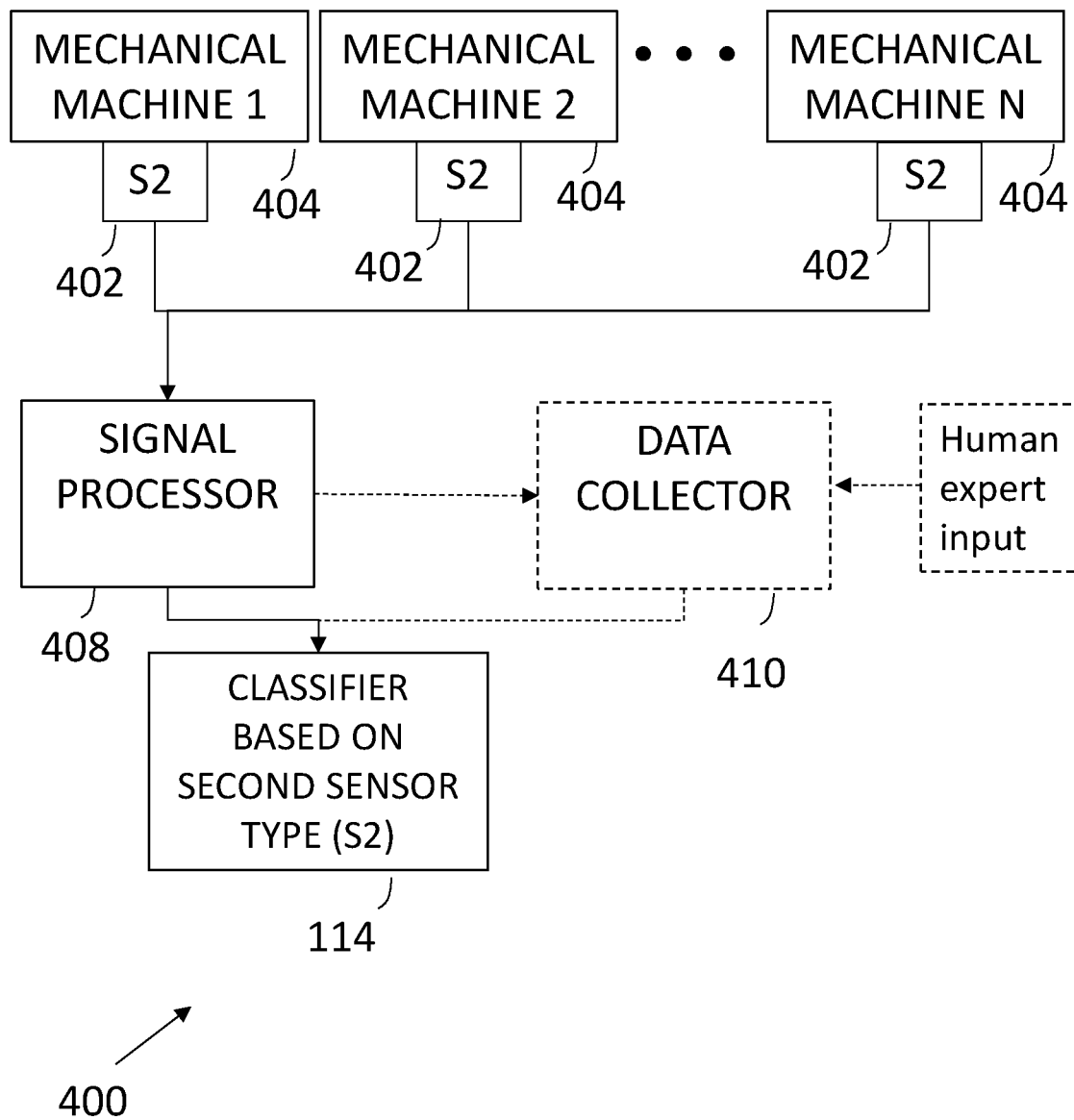
FIGS. 4A and 4B are simplified respective block diagram illustrations of components of respective systems for the training of a fault classifier employed in and modified by the system of FIG. 1 or FIG. 2.
Figure 4B:
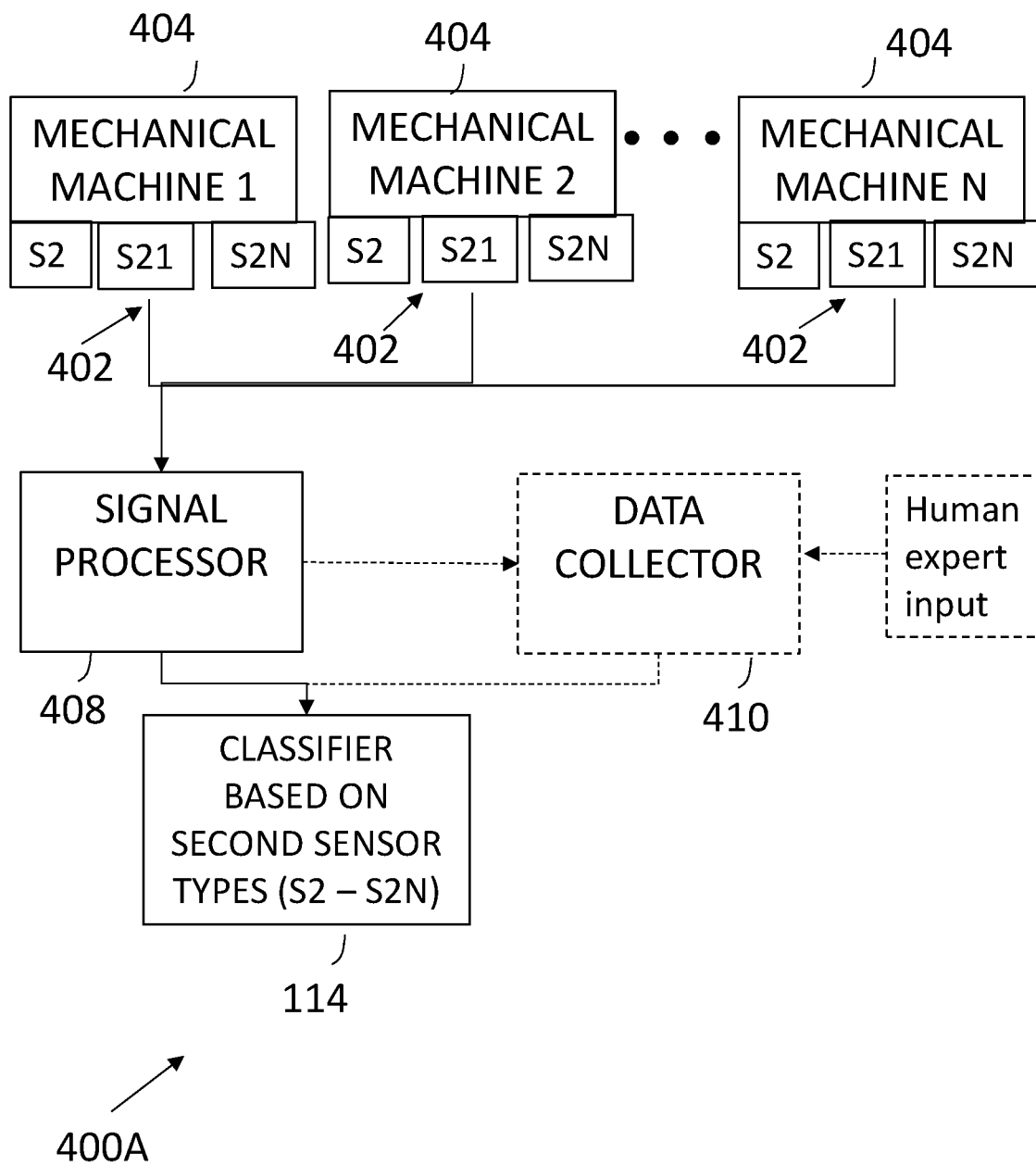

Further details of pre-existing classifier 114 itself and how pre-existing classifier 114 may be adapted or calibrated in order to produce modified classifier 116 are now provided with reference to FIGS. 3-4B, which are respectively a simplified illustration of modification of a classifier, as carried out by either of the systems of the types shown in FIGS. 1 and 2 and simplified respective block diagram illustrations of components of two possible systems for the training of a classifier employed in the system of FIG. 1 or 2. In one embodiment of the present invention, systems 100 and 100A may include a non-transitory computer-readable storage medium having stored thereon computer-executable instructions for executing, by one or more processors, the method of modification of a classifier, as detailed hereinbelow with respect to FIGS. 4A and 4B. Such processors may be remote processors or local processors.

As seen in FIG. 3, pre-existing fault classifier 114 may be an artificial neural network (ANN) classifier 300 for supervised fault and anomaly detection. For example, the ANN 300 may be configured to identify a specific fault or performance anomaly in machines having a rotating component. Without loss of generality, fault classifier 114 having a multilayer perceptron architecture is illustrated in FIG. 3. However, it is understood the systems and methods of the present invention may be applied to any type of fault classifier regardless of the structure thereof. More particularly, the numbers layers and neurons shown in FIG. 3 are by way of highly simplified example only, for the purpose of illustration of the principles of the present invention. Furthermore, pre-existing fault classifier 114 may be an unsupervised fault classifier, as described hereinabove, such as an autoencoder, deep belief network, a classifier based on clustering, K-means or hidden Markov models, or any other type of model capable of carrying out unsupervised learning.

An upper panel 302 in FIG. 3 shows an example of pre-existing classifier 114 in the original unmodified form thereof, following the training thereof and prior to any modification thereof for the purpose of mapping between sensors types, in accordance with the present invention.

Pre-existing classifier 114 may have a multi-layer architecture. A data layer 308 may be the layer comprising the input data, in the form of sets of sensor signals. An input layer 310 may be an initial layer at which sensor signal sets are input into the network 300. At each of a multiplicity of subsequent hidden layers 312 the signal sets are fused with respective weightings and an activation function applied for the combined layer output, before forwarding it to the next layer of the hidden layers 312. This process repeats itself for each layer of the hidden layers 312, until an output layer 314 is reached. Output layer 314 yields a fault score. This score represents identification of a fault. Identification of a fault may include identification of a present particular fault or anomaly or prediction of a future impending particular fault. A fault may include any type of machine anomaly.

A general mathematical expression for the ANN architecture shown in panel 302 of FIG. 3 within the network layers is $$\sum_j \sigma_j \left( \sum_i \omega_{ij} \cdot s_i + b_j \right)$$

where s is the neuron input, which for the first layer 310 is the sensor signal, $\sigma$ is the activation function, $\omega$ is the weight, b is a bias term and i and j are indices that run on the layer incoming data points and neurons, respectively.

Training of network 300 in order to generate pre-existing classifier 114 may be better understood with additional reference to FIGS. 4A and 4B.

Turning initially to FIG. 4A, a system 400 for the training of pre-existing classifier 114 may include a second plurality of sensors 402. Sensors 402 are preferably coupled to a corresponding second plurality of mechanical machines 404. Second plurality of sensors 402 may be all of a same, second type, here indicated as sensor type S2. Alternatively, sensors 402 may include multiple types of sensors coupled to each corresponding one of second plurality of mechanical machines 404. The case of second plurality of sensors 402 including multiple types of sensors is shown in a system 400A of FIG. 4B. System 400A generally resembles system 400 with the exception of the inclusion of multiple types of sensors 402 therein. Turning now to FIG. 4B, it is understood that second plurality of sensors 402 shown in FIG. 4B may include any number of sensors S2 through to S2N, such as two or more sensors. These sensors may be, for example, a combination of vibration sensors, magnetic flux sensors, current sensors, temperature sensors, or sensors for sensing other parameters associated with the operation of machines 404, such as torque, displacement, input line frequency etc. Sensors S2-S2N may be of mutually different types to each other, but are preferably of the same types with respect to each of the sets of sensors coupled to each of machines 404.

Sensors 402, e.g. sensor S2 or sensors S2-S2N, may be different than first plurality of sensors 102 of FIG. 1 or different than sensor types S1-S1N of first plurality of sensors 102 of FIG. 2. Any combination of the embodiments shown in FIGS. 1 and 2 and 4A and 4B are possible i.e. first plurality of sensors 102 may include only one type of sensor S1 and second plurality of sensors 402 may include only one type of sensor S2, which is different than S1 (embodiment of FIG. 1 and FIG. 4A); first plurality of sensors 102 may include only one type of sensor S1 and second plurality of sensors 402 may include multiple types of sensors S2-S2N, at least some of which are different than S1 (embodiment of FIG. 1 and FIG. 4B); first plurality of sensors 102 may include multiple type of sensors S1-S1N and second plurality of sensors 402 may include only one type of sensor S2, which is different than at least some of S1-S1N (embodiment of FIG. 2 and FIG. 4A); first plurality of sensors 102 may include multiple types of sensors S1-S1N and second plurality of sensors 402 may include multiple types of sensor S2-S2N, at least some of which are different than S1-S1N (embodiment of FIG. 2 and FIG. 4B).

In some embodiments, first and second plurality of sensors 102 and 402 may include some sensors in common e.g. first plurality of sensors 102 may include vibration and magnetic sensors and second plurality of sensors 402 may include only magnetic sensors.

Here, by way of example, second plurality of mechanical machines 404 is shown to include mechanical machines 1, 2 through to N, where N may be any number of mechanical machines, such as two or more mechanical machines. Typically, sensors 402 are coupled to mechanical machines 404 in a one-to-one corresponding arrangement, with one of sensors 402 coupled to a corresponding ones of machines 404. However, other arrangements are also possible, where a single sensor may be arranged to sense signals from more than one of mechanical machines 404. Sensors 402 may be physically contacting machines 404, such as directly or indirectly mounted on machines 404. Sensors 402 may alternatively be physically separated from machines 404, such as located at a given distance from machines 404, for example if sensors 402 are optical sensors.

In one embodiment of the present invention, sensors of second plurality of sensors 402 may have generally the same frequency response as each other. The frequency response of second plurality of sensors 402 may be termed the frequency response distribution of sensors 402. First plurality of sensors 102 also may have generally the same frequency response as each other. The frequency response of first plurality of sensors 102 may be termed the frequency response distribution of sensors 102. Due to sensors 402 being of a different type than sensors 102, the frequency response distribution of first plurality of sensors 102 is different than the frequency response distribution of second plurality of sensors 402. For example, first plurality of sensors 102 may be single-axis vibration sensors and second plurality of sensors 402 may be multi-axis vibration sensors, or vice versa, or first plurality of sensors may be single axis vibration sensors and second plurality of sensors may be magnetic flux sensors. Sensors 102 and 402 or sensors 402 and 102 may respectively measure vibration and magnetic flux signals; vibration and electric current signals; vibration and temperature signals; electric current and magnetic flux signals; and vibration and internal machine pressure signals, by way of example only.

Sensors 402 are preferably operative to sense signals emanating from mechanical machines 404. Mechanical machines 1-N which are members of the second plurality of mechanical machines 404 are preferably characterized by one or more shared characteristics both with each other and with mechanical machines 104. Mechanical machines 1-N may or may not be the same machines, provided that they have in common at least one shared characteristic. For example, shared characteristics may refer to type, model number, manufacturer, physical characteristics or dimensions, operating characteristics or parameters, or other shared characteristics that indicate that an observed behavior of one of the mechanical machines of the plurality of mechanical machines may be typical of another mechanical machine of the plurality.

Second plurality of sensors 402 is preferably operative to acquire a second plurality of sets of signals emanating from the second plurality of mechanical machines 404. The sets of signals may be 'signal snapshots' sensed by an appropriate one of sensors 402 for a short time period. For example, the signal may be sensed for a period of a few seconds, such as one—four seconds. Each set of signals may alternatively comprise multiple 'signal snapshots' over time, for example four second 'signal snapshots' measured each hour over a period of several hours, days or even months. Alternatively, each set of signals may comprise continuously monitored signals over a longer period or more than one period of time. For example, the signal may be monitored every millisecond, continuously.

Signals acquired by sensors 402 may be pre-processed, for example by an analog or digital processing capability of the sensor 402 itself or by other hardware and/or software processing components 408. For example, the signal may be at least one of digitized, compressed, features may be extracted from the signal and signals may be represented in the time or frequency domain.

Systems 400 and 400A may optionally include a data collection unit 410. Data collection unit 410 is preferably operative to receive a second plurality of sets of operational condition data for mechanical machines of the second plurality of mechanical machines, each set of operational condition data indicating a state of operation of a mechanical machine of said second plurality of mechanical machines 404, each state of operation being associated with a least one of the sets of signals acquired by the second plurality of sensors 402.

The operational condition data collected at data collection unit 410 is preferably in the form of machine condition diagnoses supplied by human experts, such as engineers. The sets of signals acquired by first plurality of sensors 402 may optionally be provided to data collection unit 410, either by signal processor 408 and/or directly or indirectly by sensors 402.

These human experts may analyze the sets of signals acquired by the second plurality of sensors 402 and label each set of signals of the sets of signals as representing particular states of operation of the corresponding mechanical machine 404 from which the signals emanated. The human experts may interact with a user interface, for example of the data collection unit 410 or of another device that enables communication between the human expert and the data collection unit, to enter the operational state data. The signals and the labels applied thereto may be accumulated and stored in a data base in data collection unit 410. In one embodiment of the present invention, data collection unit 410 may be located in a remote server, such as a server in the cloud.

Identification of faults by the human experts may include identification of one or more specific faults of the monitored machines 404. Depending on the specific machine 404 being monitored, the specific fault identified may include bearing wear of a rotating machine, mechanical looseness, misalignment, unbalancing, electrical faults or other faults. Identification of faults may alternatively include identification of a machine 404 being in a faulty state i.e. an anomalous state with respect to the normal, healthy operating state thereof, but without identifying a specific fault. In this case, the human expert fault identification identifies the machine as not operating in a healthy manner but does not identify what is the specific cause of the unhealthy operation.

It is to be understood that in this example, systems 400/400A preferably include data collector 410 and signals are preferably labeled by human experts, in order to train fault classifier 300 in a supervised manner. However, in other embodiments of the present invention, data collector 410 may be omitted and signals need not be labeled by human experts. In this case, pre-existing fault classifier 114 may be originally trained by using unsupervised learning.

Returning now to panel 302 of FIG. 3, network 300 may be trained by supplying thereto the sets of signals acquired by the second plurality of sensors 402 as the input data at layer 308 and supplying thereto the associated operational state data, as labeled by the human experts, as the required corresponding output at output layer 314. Training of the network 300 may be carried out using back-propagation and gradient descent algorithms with respect to pre-defined data labeling. The training parameters, such as loss function, learning rate, optimizer type etc. are preferably chosen with respect to the output score. For example, for a binary fault detection a cross-entropy loss function, Adam optimizer and L2 regularization term may be selected. The training process is first applied for the data set for which all sensors 402 are consistent within the entire data set, meaning that there is preferably no mixing between sensors 402 for each vector in the data point.

Once the training is completed, the parameters of the network 300 established based on the training are preferably fixed. These parameters include activation functions and weights. Network 300 now constitutes a pre-existing classifier, such as pre-existing classifier 114, based on sensor signal sets acquired by second plurality of sensors 402. Pre-existing classifier 114, in the form of trained network 300 shown in panel 302, is now configured to accurately classify new input data having the same or similar structure and acquired from the same or similar sources as the data based on which the pre-existing classifier 114 was trained. In this case, pre-existing classifier 114 in the form of trained network 300 is configured to accurately classify new input signals emanating from machines have a shared characteristic with machines 404 (FIGS. 4A and 4B) and sensed by sensors of the same type as second plurality of sensors 402 (FIGS. 4A and 4B). However, as detailed hereinabove, pre-existing classifier 114 in the form of trained network 300 is not capable of accurately classifying new input signals sensed by sensors of a different type than second plurality of sensors 402, such as first plurality of sensors 102 (FIGS. 1 and 2), despite these new input signals emanating from machines having a shared characteristic with machines 404, such as first plurality of machines 104. In this case, the classifier accuracy will be considerably reduced to the difference in frequency responses of the different types of sensors.

In order to render pre-existing classifier 114 capable of accurately classifying signal sets from a different type of sensor e.g. first plurality of sensors 102, than those based on which the classifier was previously trained, e.g. second plurality of sensors 402, pre-existing classifier 114 may be modified. Modification of pre-existing classifier 114, in the form of network 300, in accordance with a preferred embodiment of the present invention is shown in a lower panel 440 of FIG. 3.

As seen in lower panel 440 of FIG. 3, network 300 may be modified to produce a modified network 442. Network 300 is preferably modified by adding at least one additional layer 450 to network 300. The at least one additional layer 450 may be termed a 'mapping layer' and is configured to learn the frequency response difference between the original sensor type i.e. second plurality of sensors 402, based on which classifier 114 in the form of network 300 was trained, and the new sensor type i.e. first plurality of sensors 102, from which new data has been collected.

The configuration of mapping layer 450 may be achieved by freezing the structure and parameters of all of the layers of network 300 and retraining the classifier with the new data set acquired from first plurality of sensors 102, as provided by those elements enclosed in dashed box 115 described hereinabove with respect to FIGS. 1 and 2. In this way, the network 442 is forced to optimize weight values of mapping layer 450 with respect to the frequency response difference of the two sensors, since the parameters of all of the other layers of the network 442 are already configured and frozen and cannot be changed. As a result, mapping layer 450 is forced to learn mapping between the original sensor signal sets provided by sensors 402 (FIGS. 4A and 4B) and the new sensor signal sets provided by sensors 102 (FIGS. 1 and 2).

Alternatively, the structure and parameters of all of the layers of network 300 need not necessarily be frozen and rather may be adjusted during the retraining of the classifier with the new data set acquired from first plurality of sensors 102. In this case, the parameters of network 300 serve as a starting point for the adjusted parameters of modified classifier 442.

The configuration of mapping layer 450 is preferably chosen with respect to the nature of the frequency response difference between the different types of sensors e.g. first and second plurality of sensors 102 and 402.

In the case of mapping between different sensors of the same type e.g. first and second plurality of sensors 102 and 402 are both vibration sensors, but of different types having different frequency responses, the frequency response difference is generally a linear function of the signal frequency.

In the case of mapping between different sensors of different types e.g. first and second plurality of sensors 102 and 402 are respectively vibration and magnetic sensors having different frequency responses, the frequency response difference is generally a non-linear function and non-linear mapping is therefore required. Correspondingly, the activation function may, but does not necessarily, take a non-linear form.

In some cases, the mapping of mapping layer 450 may be assisted by providing to mapping layer 450 more complex forms of the new sensor data e.g. more complex forms of the signals acquired by first plurality of sensors 102. For example, inverse data, logarithmic data or other forms of data may be provided. The process of modifying the input signal may be optimized with respect to the classifier accuracy, whereby the new sensor data is modified per classifier accuracy performance feedback and mapping layer 450 is then retrained with the modified data.

Mapping layer 450 is preferably incorporated into network 442 as the first layer after data layer 308 and is configured as such to receive the input data in the form of the new data set. Mapping layer 450 is upstream from the original input layer 310 and precedes the original input layer 310 with respect to the input data. The location of mapping layer 450 in network 442 is important, because it is the location of mapping layer 450 as the initial layer in the network that allows mapping layer 450 to learn the mapping between the sensor types and adapt the incoming new data to be in an appropriate form for continuing to the other hidden layers 312 downstream in network 442.

In an alternative embodiment of the present invention, the pre-existing fault classifier may be originally trained in an unsupervised manner by providing a large quantity of sensor data thereto, in order for the classifier to learn how to identify anomalies in the sensor data relating to machine operating condition. For example, an auto-encoder NN may be used to learn a low-dimensionality representation of the sensor data and clustering based classification then used to identify outliers (anomalies). Such a pre-existing unsupervised fault classifier 114 may then be modified in an unsupervised way, in accordance with a preferred embodiment of the present invention, in order to produce modified fault classifier 116 adapted to identify anomalies in sensor data acquired by a different type of sensor than that based on which pre-existing fault classifier 114 was originally trained. Modified fault classifier 116 may be produced, for example, by adding an initial mapping layer to the auto-encoder NN, freezing parameters of all layers of the network besides for the mapping layer and training the mapping layer to learn the mapping between the original and new sensor types. During the training of the mapping layer, another mapping layer, such as an inverse mapping layer, may additionally be added at the NN output, after the decoder, for the sake of the training process. The output may then be classified using clustering based classification in order to identifier outliers (anomalies).

The improvement in classifier performance as a result of the mapping learning of the present invention is illustrated in the following exemplary graphs:

In FIG. 5A, an example is shown of the performance, in the form of a precision-recall curve, of the modified classifier of the present invention. In this example, a fault classifier was originally trained and validated on a data set comprising over 100,000 labeled signal sets, of which 7000 signal sets indicated machine faults, acquired from rotating machines including bearings, by single-axis vibration sensors. Following training, the fault classifier was tested on a data set comprising 20,000 signal sets, 1,400 of which corresponded to machine faults. The fault classifier thus trained may be termed the pre-existing fault classifier.

The pre-existing classifier was then modified in accordance with a preferred embodiment of the present invention, in order to be rendered capable of classifying faults based on signals acquired by tri-axial vibration sensors from rotating machines including bearings. The new data set of signals acquired by tri-axial vibration sensors and used to modify the pre-existing fault classifier comprised a training and validation data set of 256 signal sets, of which only 20 sets of signals were associated with faulty machine states, namely bearing wear. The pre-existing fault classifier was modified, as described above, based on this very small signal set.

The modified fault classifier was then applied to a test set of 7,149 signals sets, of which 486 signal sets were associated with faulty machine states, of signals acquired by tri-axial vibration sensors from rotating machines including bearings for fault detection, in order to test the performance thereof (line 502). For the sake of comparison, an entirely new classifier was trained 'from scratch' with the same 256 sets of signals and applied to the same test set of 7,149 signal sets. (line 504). For the sake of completeness of comparison, the original pre-existing classifier in its unmodified form was also applied to the 7149 example set of data (line 506). As is clear from consideration of FIG. 5A, the performance of the modified classifier in fault identification is the best, despite the extremely small data set supplied. The scores listed in FIG. 5A are average precision scores, although other example scores may be used.

In FIG. 5B, an example is shown of the performance, in the form of a precision-recall curve, of the modified classifier of the present invention. In this example, a fault classifier was originally trained and validated on a data set comprising over 100,000 labeled signal sets, of which 7,000 signal sets indicated machine faults, acquired from rotating machines including bearings, by single-axis vibration sensors. Following training, the fault classifier was tested on a data set comprising 20,000 signal sets, 1,400 of which corresponded to machine faults. The fault classifier thus trained may be termed the pre-existing fault classifier.

The pre-existing classifier was then modified in accordance with a preferred embodiment of the present invention, in order to be rendered capable of classifying faults based on signals acquired by tri-axial vibration sensors from rotating machines including bearings. The new data set of signals acquired by tri-axial vibration sensors and used to modify the pre-existing fault classifier comprised 924 signals sets, of which only 70 sets of signals were associated with faulty machine states, namely bearing wear. The pre-existing fault classifier was modified, as described above, based on this very small signal set. The modified fault classifier was then applied to a set of 6841 signal sets, including 436 sets of signals corresponding to machine faults, acquired by tri-axial vibration sensors from rotating machines including bearings for fault detection, in order to test the performance thereof (line 510). For the sake of comparison, an entirely new classifier was trained 'from scratch' with the same 924 sets of signals and also applied to the 6841 example sets of data (line 512). For the sake of completeness of comparison, the original pre-existing classifier in its unmodified form was also applied to the 6841 example sets of data (line 514). As is clear from consideration of FIG. 5B, the performance of the modified classifier in fault identification is the best, despite the small data set supplied. The scores listed in FIG. 5B are average precision scores, although other example scores may be used.

In FIG. 5C, an example is shown of the performance, in the form of a precision-recall curve, of the modified classifier of the present invention. In this example, a fault classifier was originally trained and validated on a data set comprising over 100,000 labeled signal sets, of which 7,000 signal sets indicated machine faults, acquired from rotating machines including bearings, by single-axis vibration sensors. Following training, the fault classifier was tested on a data set comprising 20,000 signal sets, 1,400 of which corresponded to machine faults. The fault classifier thus trained may be termed the pre-existing fault classifier.

The pre-existing classifier was then modified, in order to be capable of classifying faults based on signals acquired by tri-axial vibration sensors from rotating machines including bearings. The new data set of signals acquired by tri-axial vibration sensors and used to modify the pre-existing fault classifier comprised 5924 sets of signals, of which only 350 sets of signals were associated with faulty machine states, namely bearing wear. The pre-existing fault classifier was modified, as described above, based on this small signal set. The modified fault classifier was then applied to a set of 1481 example sets of signals, including 156 sets of signals corresponding to machine faults, acquired by tri-axial vibration sensors from rotating machines including bearings for fault detection, in order to test the performance thereof (line 520). For the sake of comparison, an entirely new classifier was trained with the same 5924 sets of signals and also applied to the 1481 example sets of data (line 522). For the sake of completeness of comparison, the original pre-existing classifier in its unmodified form was also applied to the 1481 example set of data (line 524). As is clear from consideration of FIG. 5C, the performance of the modified classifier in fault identification is the best. The scores listed in FIG. 5C are average precision scores, although other example scores may be used.

In FIG. 5D, an example is shown of the performance, in the form of a precision-recall curve, of the modified classifier of the present invention. In this example, a fault classifier was trained and validated on a data set comprising over 100,000 labeled signal sets, of which 7,000 signal sets indicated machine faults, acquired from electrical motors including bearings, by single-axis vibration sensors. Following training, the fault classifier was tested on a data set comprising 20,000 signal sets, 1,400 of which corresponded to machine faults. The fault classifier thus trained may be termed the pre-existing fault classifier.

The pre-existing classifier was modified, in order to be capable of classifying faults based on magnetic flux signals acquired by magnetic sensors from electrical motors including bearings. The new data set of signals acquired by magnetic sensors and used to modify the pre-existing fault classifier comprised 3411 sets of signals, of which only 222 sets of signals were associated with faulty machine states, namely bearing wear. The pre-existing fault classifier was modified, as described above, based on this small signal set. The pre-existing fault classifier was then applied to a test signal set of 754 signals, including only 50 example sets of signals corresponding to machine faults, acquired by magnetic sensors from electrical motors including bearings for fault detection, in order to test the performance thereof (line 530). For the sake of comparison, an entirely new classifier was trained with the same 3411 sets of magnetic signals and also applied to the same 754 example sets of magnetic data (line 532). For the sake of completeness of comparison, the original pre-existing classifier in its unmodified form was also applied to the same 754 example set of magnetic data (line 534). As is clear from consideration of FIG. 5D, the performance of the modified classifier in fault identification is the best. The scores listed in FIG. 5D are average precision scores, although other example scores may be used.

In the above examples of FIGS. 5A-5D, the data set based on which the classifier 114 was originally trained consisted of data sensed from more than 40,000 individual rotating machines, including primarily motors, pumps, fans, gear boxes, chillers and compressors. The bearing recordings, some of which were measured more than once, were recorded over a period of three years. Each bearing was measured along three axes by a single axis piezo-electric vibration sensor. In the case that the new data set comprised data from a tri-axial vibration sensor, this was a MEMS tri-axial vibration sensor.

As evident from the above data, the fault ratio in the dataset was approximately 7%. The classifier was designed to detect a single bearing fault, such that even in cases where additional non-faulty machine bearings gave rise to signals exhibiting the signature of bearing wear, due to the vicinity of the non-faulty bearings to faulty bearings and due to acoustic wave propagation between the bearings, the classifier was capable of correctly classifying the non-faulty bearings as such. Labelling of the data was carried out by more than 10 human experts.

Figure 6:
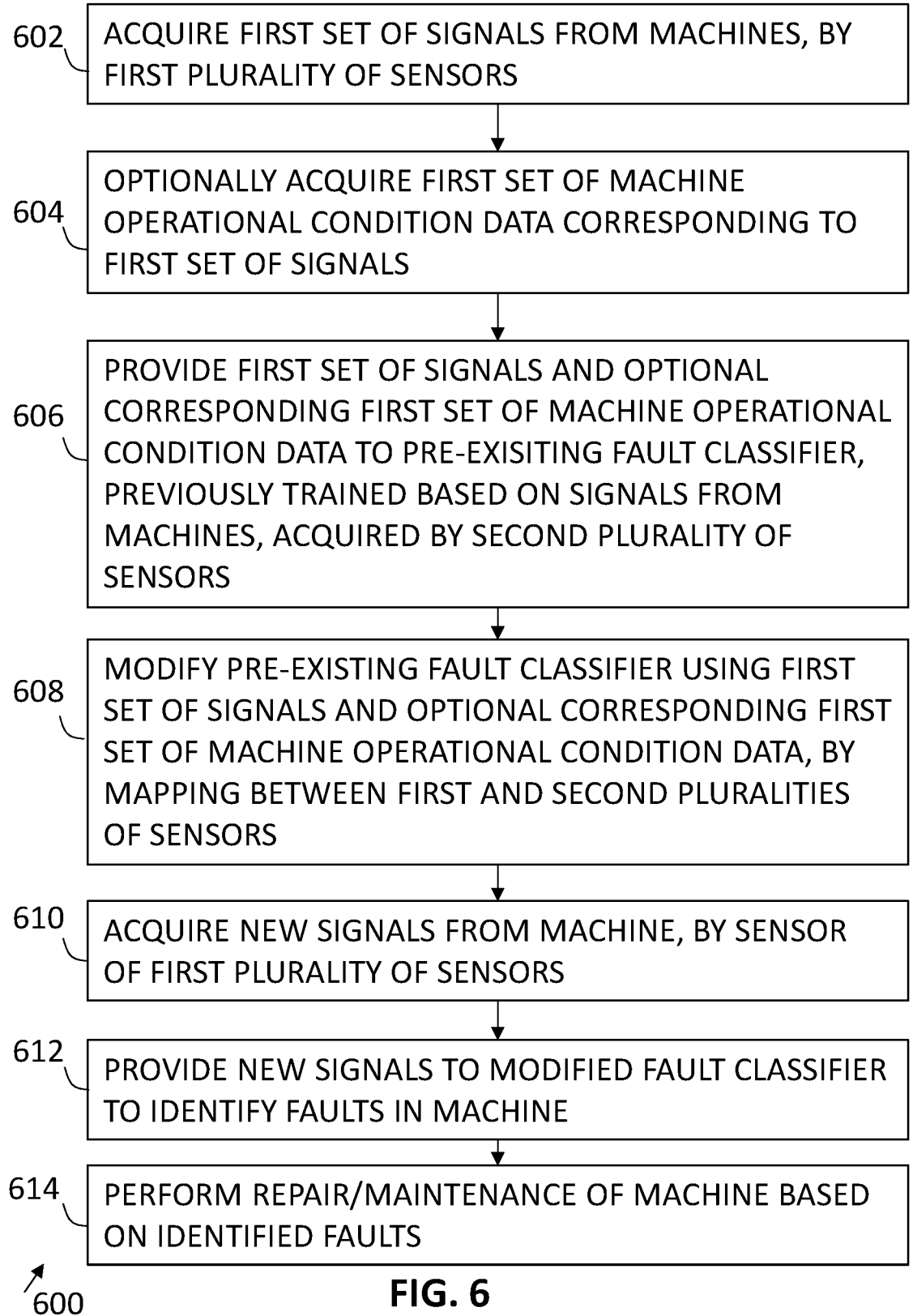
FIG. 6 is a simplified flow chart illustrating steps involved in a method for mechanical machine fault identification, in accordance with a preferred embodiment of the present invention.

Reference is now made to FIG. 6, which is a simplified flow chart illustrating steps involved in a method for mechanical machine fault identification based on transfer learning, in accordance with a preferred embodiment of the present invention.

Shown in FIG. 6 is a method 600 for machine fault identification. As seen at a first step 602, a first set of signals emanating from a plurality of mechanical machines may be acquired by a first plurality of sensors. Sensors of the first plurality of sensors are preferably of a first, mutually same, type. Alternatively, sensors of the first plurality of sensors may be of multiple types. Sensors of the first plurality of sensors may have generally the same sensor frequency response, which may be termed the first sensor frequency response distribution.

As seen at a second step 604, a first set of machine operational condition data may optionally be acquired, corresponding to the first set of signals acquired at step 602. The machine operational condition data may include identification of an operational state associated with each set of signals of the first set of signals. The operational state may be a faulty or non-faulty state.

As seen at a third step 606, the sets of signals and optional corresponding operational condition data are supplied to a pre-existing fault classifier, previously trained to identify faults in machines based on signals emanating from the machines and acquired by a second plurality of sensors. The second plurality of sensors, based on which the pre-existing fault classifier was trained, may be of a mutually same type as each other but different from the type of the first plurality of sensors. The second plurality of sensors, based on which the pre-existing fault classifier was trained, may alternatively be of multiple types, at least some of which are different from the first plurality of sensors. Sensors of the second plurality of sensors may have generally the same sensor frequency response, which may be termed the second sensor frequency response distribution. The second sensor frequency response distribution may be different from the first sensor frequency response distribution of the first plurality of sensors.

As seen at a fourth step 608, the pre-existing fault classifier is preferably modified, using a transfer learning approach and based on the new data supplied thereto. The modification may involve the addition of at least one mapping layer to the pre-existing fault classifier, which mapping layer may learn the frequency response difference between the first sensor frequency response distribution and the second sensor frequency response distribution.

As seen at a fifth step 610, an additional set of signals may subsequently be acquired from at least one machine by the same sensor type as the first plurality of sensors.

As seen at a sixth step 612, the modified classifier produced at step 608 may be applied to the additional set of signals, in order to identify faults in the machines by which the additional set of signals were generated.

As seen at a seventh step 614, based on the faults identified, machine maintenance or repair may be performed.

It is understood that all of the various machines described as generating signals at steps 602, 606 and 610 may be the same machines or different machines having a shared characteristic, as described hereinabove.

It will be appreciated by persons skilled in the art that the present invention is not limited to what has been particularly shown and described hereinabove. The scope of the present invention includes both combinations and subcombinations of various features described hereinabove as well as modifications thereof, all of which are not in the prior art.

The invention claimed is:

1. A method for identifying a fault of at least one mechanical machine, comprising:

causing a first plurality of sensors coupled to a corresponding first plurality of mechanical machines to acquire a first plurality of sets of signals emanating from said first plurality of mechanical machines, said first plurality of mechanical machines sharing at least one characteristic;

supplying at least said first plurality of sets of signals of said first plurality of mechanical machines to a pre-existing fault classifier previously trained to automatically identify faults of a second plurality of mechanical machines based on signals emanating therefrom and previously acquired by a second plurality of sensors, said second plurality of sensors being of a different type than said first plurality of sensors, said second plurality of mechanical machines sharing said at least one characteristic;

modifying said pre-existing fault classifier by employing transfer learning, based at least on said first plurality of sets of signals of said first plurality of mechanical machines, thereby providing a modified fault classifier, wherein said pre-existing fault classifier comprises a neural network including a data layer and an input layer for receiving data from said data layer, and said modifying said pre-existing fault classifier comprises adding at least one mapping layer to said neural network, said at least one mapping layer being added between said data layer and said input layer, whereby said at least one mapping layer is configured to receive said data from said data layer in said modified fault classifier;

applying said modified fault classifier to at least one additional set of signals acquired by at least one sensor of said first plurality of sensors and emanating from at least one given mechanical machine sharing said at least one characteristic, said modified fault classifier being configured to automatically identify at least one fault of said at least one given mechanical machine based on said at least one additional set of signals; and providing a human sensible output, by an output device, including at least identification of said fault of said at least one given mechanical machine, at least one of a repair or maintenance operation being performed based on said human sensible output.

2. The method according to claim 1 and also comprising, following said causing said first plurality of sensors to acquire said first plurality of sets of signals and prior to said supplying said first plurality of sets of signals to said pre-existing fault classifier:

obtaining a first plurality of sets of operational condition data for mechanical machines of said first plurality of mechanical machines, each set of operational condition data indicating a state of operation of a mechanical machine of said first plurality of mechanical machines, each state of operation being associated with a least one of said sets of signals;

said supplying at least said first plurality of sets of signals to said pre-existing fault classifier also comprising supplying said operational condition data of said first plurality of mechanical machines to said pre-existing fault classifier;

said modifying said pre-existing fault classifier by employing transfer learning, based at least on said first plurality of sets of signals also comprising modifying said pre-existing fault classifier by employing transfer learning, additionally based on said first plurality of sets of operational condition data of said first plurality of mechanical machines.

3. The method according to claim 2, said neural network being otherwise unmodified by said modifying, besides the addition of said at least one mapping layer.

4. The method according to claim 2, wherein at least some of said states of operation of a mechanical machine of said first plurality of mechanical machines, as indicated by said first plurality of sets of operational condition data, are states of faulty operation.

5. The method according to claim 4, wherein said first plurality of sets of signals and said first plurality of sets of operational condition data of said first plurality of mechanical machines include less than 30 of said states of faulty operation.

6. The method according to claim 1, wherein said identification of said fault comprises identification of a specific fault of said at least one given mechanical machine and a prediction of failure of said at least one given mechanical machine due to said specific fault in the absence of performance of a recommended maintenance operation thereupon, wherein said at least one given mechanical machine would indeed fail in the absence of performance of said recommended maintenance operation.

7. The method according to claim 1, wherein said first plurality of sensors has a first frequency response distribution and said second plurality of sensors has a second frequency response distribution, said mapping layer being configured to map between said first and second frequency response distributions.

8. The method according to claim 1, wherein said first plurality of sensors is operative to sense a same type of signal as sensed by said second plurality of sensors.

9. The method according to claim 8, wherein said same type of signal comprises one of a vibration signal, a magnetic flux signal, a current, a temperature and an internal machine pressure signal.

10. The method according to claim 1, wherein said first plurality of sensors and said second plurality of sensors are operative to sense mutually different types of signals.

11. The method according to claim 10, wherein said mutually different types of signals comprise at least one of:
vibration and magnetic flux signals;
vibration and electric current signals;
vibration and temperature signals;
electric current and magnetic flux signals; and
vibration and internal machine pressure signals.

12. A system for identifying a fault of at least one mechanical machine, comprising:

a first plurality of sensors coupled to a corresponding first plurality of mechanical machines and operative to acquire a first plurality of sets of signals emanating from said first plurality of mechanical machines, said first plurality of mechanical machines sharing at least one characteristic;

a data processing unit operative to:
receive said first plurality of sets of signals of said first plurality of mechanical machines, said data processing unit comprising a pre-existing fault classifier previously trained to automatically classify states of operation of a second plurality of mechanical machines based on signals emanating therefrom and previously acquired by a second plurality of sensors, said second plurality of sensors being of a different type than said first plurality of sensors, said second plurality of mechanical machines sharing said at least one characteristic;

modify said pre-existing fault classifier by employing transfer learning, based at least on said first plurality of sets of signals of said first plurality of mechanical machines, thereby providing a modified fault classifier, wherein said pre-existing fault classifier comprises a neural network including a data layer and an input layer for receiving data from said data layer, and modification of said pre-existing fault classifier comprises an addition of at least one mapping layer to said neural network between said data layer and said input layer, whereby said at least one mapping layer is configured to receive said data from said data layer in said modified fault classifier, and apply said modified fault classifier to at least one additional set of signals acquired by at least one sensor of said first plurality of sensors and emanating from at least one given mechanical machine sharing said at least one characteristic, said modified fault classifier being configured to automatically identify at least one fault of said at least one given mechanical machine based on said at least one additional set of signals, and an output device in communication with said data processing unit and operative to provide a human sensible output including at least identification of said fault of said at least one given mechanical machine, at least one of a repair or maintenance operation being performed based on said human sensible output.

13. The system according to claim 12 and also comprising a data collection unit operative to obtain a first plurality of sets of operational condition data for mechanical machines of said first plurality of mechanical machines, each set of operational condition data indicating a state of operation of a mechanical machine of said first plurality of mechanical machines, each state of operation being associated with a least one of said sets of signals;

said data processing unit being operative to receive said operational condition data of said first plurality of mechanical machines and to modify said pre-existing fault classifier additionally based on said first plurality of sets of operational condition data of said first plurality of mechanical machines.

14. The system according to claim 13, wherein said neural network is otherwise unmodified by said modification, besides the addition of said at least one mapping layer.

15. The system according to claim 13, wherein at least some of said states of operation of a mechanical machine of said first plurality of mechanical machines, as indicated by said first plurality of sets of operational condition data, are states of faulty operation.

16. The system according to claim 15, wherein said first plurality of sets of signals and said first plurality of sets of operational condition data of said first plurality of mechanical machines include less than 30 of said states of faulty operation.

17. The system according to claim 12, wherein said identification of said fault comprises identification of a specific fault of said at least one given mechanical machine and a prediction of failure of said at least one given mechanical machine due to said specific fault in the absence of performance of a recommended maintenance operation thereupon, wherein said at least one given mechanical machine would indeed fail in the absence of performance of said recommended maintenance operation.

18. The system according to claim 12, wherein said first plurality of sensors has a first frequency response distribution and said second plurality of sensors has a second frequency response distribution, said mapping layer being configured to map between said first and second frequency response distributions.

19. The system according to claim 12, wherein said first plurality of sensors is operative to sense a same type of signal as sensed by said second plurality of sensors.

20. The system according to claim 19, wherein said same type of signal comprises one of a vibration signal, a magnetic flux signal, a current, a temperature and an internal machine pressure signal.

21. The system according to claim 12, wherein said first plurality of sensors and said second plurality of sensors are operative to sense mutually different types of signals.

22. The system according to claim 21, wherein said mutually different types of signals comprise at least one of:
vibration and magnetic flux signals;
vibration and electric current signals;
vibration and temperature signals;
electric current and magnetic flux signals; and
vibration and internal machine pressure signals.

* * * * *